United States Patent
Di Trapani et al.

(10) Patent No.: US 10,459,130 B2
(45) Date of Patent: Oct. 29, 2019

(54) CHROMATIC REFLECTIVE UNIT

(71) Applicant: COELUX S.R.L., Lomazzo (CO) (IT)

(72) Inventors: Paolo Di Trapani, Cavallasca (IT); Davide Magatti, Capiago Intimiano (IT)

(73) Assignee: COELUX S.R.L., Lomazzo (CO) (IT)

( * ) Notice: Subject to any disclaimer, the term of this patent is extended or adjusted under 35 U.S.C. 154(b) by 62 days.

(21) Appl. No.: 15/742,799

(22) PCT Filed: Jul. 15, 2015

(86) PCT No.: PCT/EP2015/001454
§ 371 (c)(1),
(2) Date: Jan. 8, 2018

(87) PCT Pub. No.: WO2017/008821
PCT Pub. Date: Jan. 19, 2017

(65) Prior Publication Data
US 2018/0203165 A1 Jul. 19, 2018

(51) Int. Cl.
*G02B 5/02* (2006.01)
*C03C 17/34* (2006.01)
(Continued)

(52) U.S. Cl.
CPC ........ *G02B 5/0284* (2013.01); *B32B 17/1022* (2013.01); *C03C 17/06* (2013.01);
(Continued)

(58) Field of Classification Search
None
See application file for complete search history.

(56) References Cited

U.S. PATENT DOCUMENTS

| 8,068,285 | B1 | 11/2011 | Flynn | |
|---|---|---|---|---|
| 2015/0173302 | A1* | 6/2015 | Duncan | A01G 22/00 47/58.1 R |

(Continued)

FOREIGN PATENT DOCUMENTS

| EP | 1635200 A1 | 3/2006 |
|---|---|---|
| EP | 1919000 A1 | 5/2008 |

(Continued)

OTHER PUBLICATIONS

Standard Terminology of Appearance, ASTM International, Designation: E284-09a, downloaded Feb. 2012, pp. 1-23 (23 total pages).
(Continued)

*Primary Examiner* — Elmito Breval
(74) *Attorney, Agent, or Firm* — DiBerardino McGovern IP Group LLC

(57) ABSTRACT

In an aspect, a chromatic reflective unit (1) comprises a support structure (7) comprising a plurality of non-coplanar surface sections (7'), a reflective layer (3) formed on the plurality of non-coplanar surface sections (7'), thereby forming a plurality of non-coplanar reflective surface sections (3'), respectively associated with one of the plurality of non-coplanar surface sections (7'), and a chromatic diffusing layer (5) having a back side provided at the reflective surface sections (3') and a front side for being illuminated by incident light (9), wherein the chromatic diffusing layer (5) comprises a plurality of nanoparticles (37) embedded in a matrix (39), and is configured to provide for—together with non-coplanar reflective surface sections (3')—a specular reflectance that is larger in the red than in the blue and for a diffuse reflectance that is larger in the blue than in the red.

34 Claims, 14 Drawing Sheets

(51) Int. Cl.
*G02B 5/08* (2006.01)
*B32B 17/10* (2006.01)
*F21V 7/00* (2006.01)
*C03C 17/06* (2006.01)
*E04F 13/077* (2006.01)
*F21V 7/04* (2006.01)
*F21V 9/02* (2018.01)
*G02B 5/10* (2006.01)

(52) U.S. Cl.
CPC ............ *C03C 17/34* (2013.01); *E04F 13/077* (2013.01); *F21V 7/0008* (2013.01); *F21V 7/04* (2013.01); *F21V 9/02* (2013.01); *G02B 5/0242* (2013.01); *G02B 5/0808* (2013.01); *G02B 5/10* (2013.01); *B32B 2307/416* (2013.01); *C03C 2217/252* (2013.01); *C03C 2217/445* (2013.01); *C03C 2217/452* (2013.01); *C03C 2217/48* (2013.01); *C03C 2217/72* (2013.01)

(56) References Cited

U.S. PATENT DOCUMENTS

| | | | | |
|---|---|---|---|---|
| 2015/0354782 | A1* | 12/2015 | Konishi | F21V 7/22 362/277 |
| 2015/0362832 | A1* | 12/2015 | Chuang | G03B 21/602 359/455 |
| 2016/0363777 | A1 | 12/2016 | Flynn et al. | |
| 2017/0074486 | A1 | 3/2017 | Flynn et al. | |

FOREIGN PATENT DOCUMENTS

| | | |
|---|---|---|
| EP | 2202454 A2 | 6/2010 |
| EP | 2221349 A1 | 8/2010 |
| EP | 2786972 A1 | 10/2014 |
| EP | 2873709 A1 | 5/2015 |
| GB | 2450192 C | 12/2005 |
| JP | S57-121901 U | 7/1982 |
| JP | S57-133011 U | 8/1982 |
| JP | 2000-122580 A | 4/2000 |
| JP | 2001-141912 A | 5/2001 |
| JP | 2002-107513 A | 4/2002 |
| JP | 2002-207446 A | 7/2002 |
| JP | 2007-009473 A | 1/2007 |
| JP | 2014-012945 A | 1/2014 |
| KR | 10-1493027 B1 | 2/2015 |
| WO | 2009156347 A1 | 12/2009 |
| WO | 2009156348 A1 | 12/2009 |
| WO | 2012054318 A1 | 4/2012 |
| WO | 2013011481 A2 | 1/2013 |
| WO | 2014058748 A1 | 4/2014 |
| WO | 2014076656 A1 | 5/2014 |
| WO | 2014/178837 A1 | 11/2014 |
| WO | 2015036057 A1 | 3/2015 |
| WO | 2015172794 A1 | 11/2015 |
| WO | 2015172821 A1 | 11/2015 |
| WO | 2016134732 A1 | 9/2016 |
| WO | 2016134733 A1 | 9/2016 |
| WO | 2017008822 A1 | 1/2017 |
| WO | 2017085079 A1 | 5/2017 |

OTHER PUBLICATIONS

Friedhelm Fensterseifer, "Reflection Haze," BYK-Gardner Catalog, 2010/2011, pp. 27-28 (2 total pages).
T.C. Greenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.
Charlotte Albayrak, European International Searching Authority, International Search Report and Written Opinion, counterpart PCT Application No. PCT/EP2015/001454, dated May 13, 2016, 10 pages total.
Office Action, counterpart Japanese Patent Application No. 2018-502008, dated Jun. 4, 2019, 9 pages total (including English translation of 4 pages).

* cited by examiner

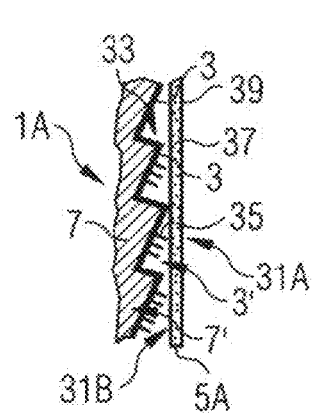
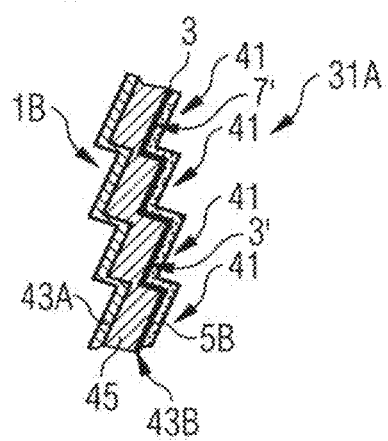
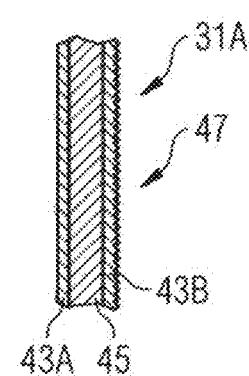
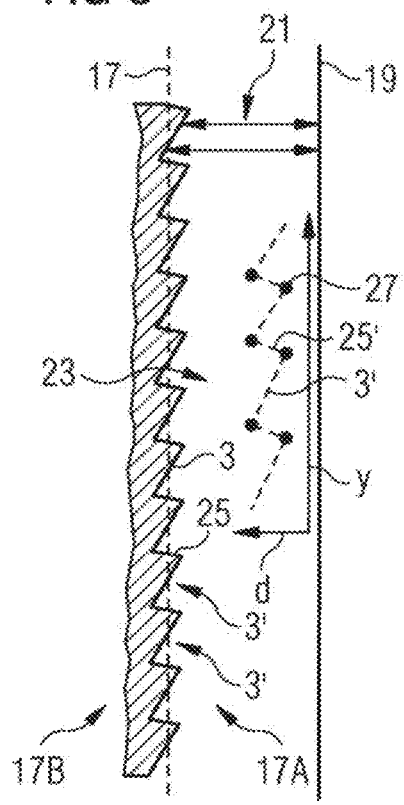
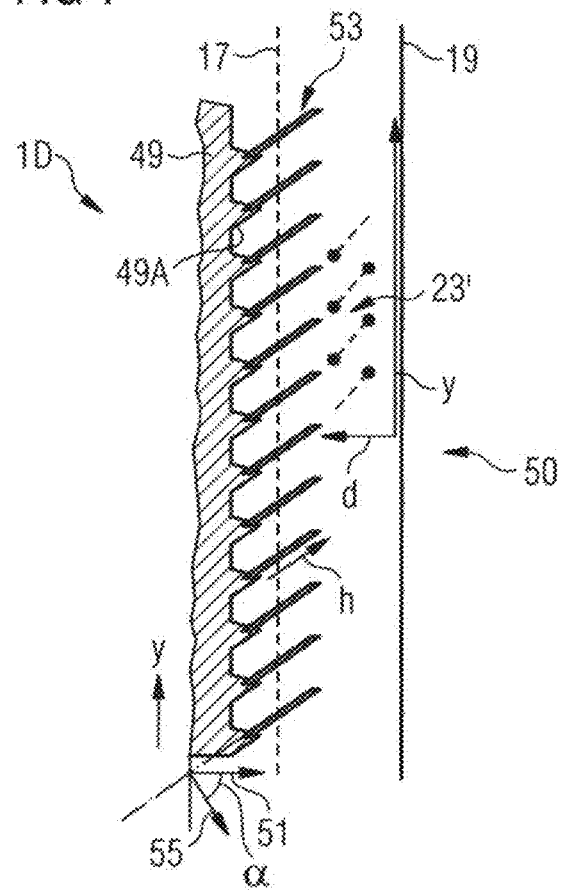

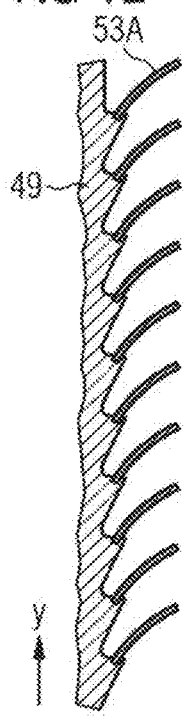
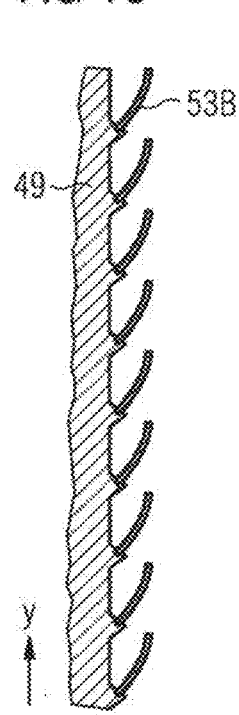
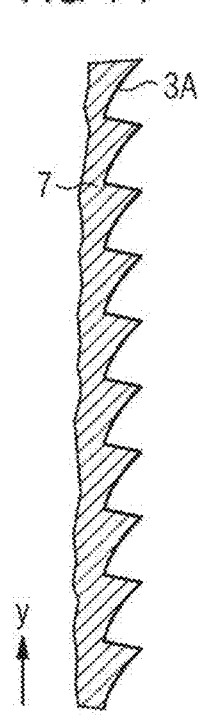
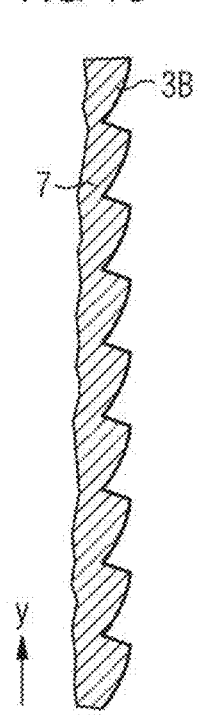
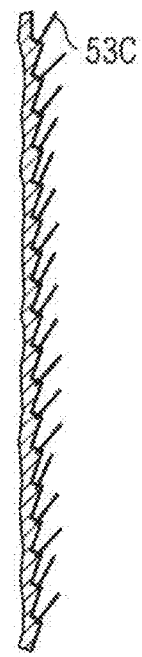
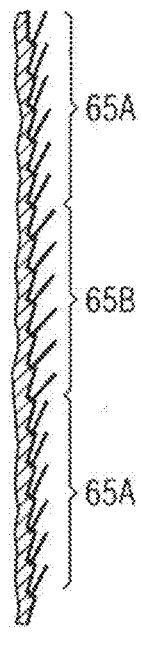
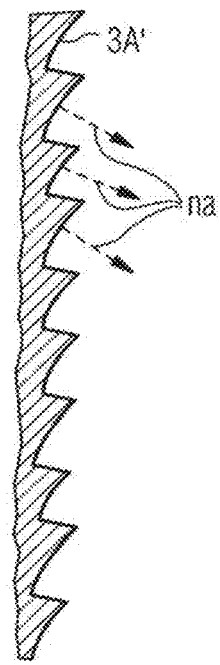

CHROMATIC REFLECTIVE UNIT

TECHNICAL FIELD

The present disclosure relates generally to chromatic mirror units and in particular to nanoparticle based light affecting units that may be applied in lighting systems or in facade structures of buildings to provide for a desired optical and visual effect.

BACKGROUND

The improvements in mirror manufacturing techniques during the 16th century caused an increasing use of optical mirror elements in interior architecture. For example, the overlay of a portion of a wall with a reflective surface generated the impression of space enhancement and an increase of depth perception. Since then, mirrors became essential components capable of improving the comfort of an ambience through a widening in the perceived volume. In general, in modern and contemporary architecture, reflective surfaces are used to provide for specific perceptions by an observer.

The following disclosure is at least partly based on specific nanoparticle based reflective units, and their application in the fields of active and passive illumination such as in lighting in general or outdoor facade applications.

As will be disclosed herein, the specific nanoparticle based reflective units may be used to provide for a specific visual perception of an outdoor or indoor wall for the observer. Those units may provide specific chromatic and reflective features that provide for properties of sun imitating lighting systems such as described, for example, in the international patent application PCT/EP2014/059802, filed on 13 May 2014 by the same applicants, in which reflective and diffusing layers are combined.

For example, in modern architecture, facade structures combine a large variety of functions. Primarily, there is the aesthetic aspect addressing the perception of a building and how it is perceived in the environment of other buildings, under different weather conditions, and respective illumination situations. Furthermore, active illumination of buildings allows providing specific visual impressions of buildings even at night.

On Rayleigh-like diffusing layers, several applications such as EP 2 30 478 A1, EP 2 304 480 A1, and WO 2014/076656 A1, filed by the same applicants, disclose lighting systems that use a light source producing visible light, and a panel containing nanoparticles used in transmission, i.e. the light source and the illuminated area are positioned on opposing sides of the panel. During operation of those lighting systems, the panel receives the light from the light source and acts in transmission as a so-called Rayleigh diffuser, namely it diffuses incident light similarly to the earth atmosphere in clear-sky conditions. Specifically, the concepts refer to directional light with lower correlated color temperature (CCT), which corresponds to sunlight, and diffuse light with larger CCT, which corresponds to the light of the blue sky.

Introducing a reflective feature as, for example, in PCT/EP2014/059802 mentioned above, however, may affect the perception due to the presence of the reflection. In particular, for lighting systems that intend to trick the eye by providing a natural imitating sky sun illumination, for example together with a visual appearance of the sky and the sun, inhomogeneities in color and luminance are avoided or at least reduced in order to preserve the desired optical and visual effect. On the other side, a mirror-like facade may—similar to large windows—disadvantageously not be recognized by birds flying against and impacting on the facade that is, for example, perceived as the sky.

Thus, the present disclosure is directed, at least in part, to improving or overcoming one or more aspects of prior systems.

SUMMARY OF THE DISCLOSURE

In a first aspect, the present disclosure is directed to a chromatic reflective unit comprising a support structure with a plurality of non-coplanar surface sections, a reflective layer formed on the plurality of non-coplanar surface sections, thereby forming a plurality of non-coplanar reflective surface sections, respectively associated with one of the plurality of non-coplanar surface sections, and a chromatic diffusing layer having a back side provided at the reflective surface sections and a front side for being illuminated by incident light, wherein the chromatic diffusing layer comprises a plurality of nanoparticles embedded in a matrix, and is configured to provide for—together with non-coplanar reflective surface sections (3')—a specular reflectance that is larger in the red than in the blue and for a diffuse reflectance that is larger in the blue than in the red.

In another aspect, a chromatic reflective unit comprises a support structure configured as a chromatic diffusing layer having a back side comprising a plurality of non-coplanar surface sections and a front side for being illuminated by incident light. The chromatic diffusing layer comprises a plurality of nanoparticles embedded in a matrix, and is configured to provide for a specular reflectance that is larger in the red than in the blue and for a diffuse reflectance that is larger in the blue than in the red. The chromatic reflective unit comprises further a reflective layer formed on the plurality of non-coplanar surface sections of the back side, thereby forming a plurality of non-coplanar reflective surface sections, respectively associated with one of the plurality of non-coplanar surface sections.

In another aspect, a chromatic reflective unit comprises a support structure comprising a continuous coarse grain surface comprising a plurality of mosaic-like surface structures providing a plurality of surface sections, a reflective layer formed on the continuous coarse grain surface, thereby forming a plurality of non-coplanar reflective surface sections, and a chromatic diffusing layer having a back side provided at the reflective surface sections and a front side for being illuminated by incident light, wherein the chromatic diffusing layer comprises a plurality of nanoparticles embedded in a matrix, and is configured—together with the reflective layer—to provide for a specular reflectance that is larger in the red than in the blue and for a diffuse reflectance that is larger in the blue than in the red.

In another aspect, a chromatic reflective unit comprises a support structure configured as a chromatic diffusing layer having a back side comprising a continuous coarse grain surface comprising a plurality of mosaic-like surface structures providing a plurality of surface sections and a front side for being illuminated by incident light, wherein the chromatic diffusing layer comprises a plurality of nanoparticles embedded in a matrix, and is configured to provide for a specular reflectance that is larger in the red than in the blue and for a diffuse reflectance that is larger in the blue than in the red, and a reflective layer formed on the a continuous coarse grain surface, thereby forming a plurality of non-coplanar reflective surface sections.

In another aspect, the present disclosure is directed to a façade element for a building (inside or outside) that use the above summarized and herein disclosed chromatic reflective units to provide for a specific appearance, in particular in a natural (sun-sky-based) manner.

It will be understood herein that non-coplanar reflective surface sections do not lie in the same plane and that any combination of a reflective surface section with a chromatic diffusing layer (or optically associated section of a chromatic diffusing layer) can be considered to form a chromatic reflective section of the chromatic reflective unit.

The support structure in general comprises a surface side on which the plurality of non-coplanar surface sections are formed. The surface side essentially extends in general as a surface (planar or curved) and provides the basic surface type of the chromatic reflective unit.

Other aspects include chromatic reflective structural units for attaching to a wall of a building, buildings with a wall and a façade structure attached to the wall based on chromatic reflective structural units as disclosed herein, and illumination systems using chromatic reflective units as disclosed herein. In addition, aspects relate to a method for providing an outside portion of a building with the visual appearance from an observer area on the ground that is similar to an appearance of the real sky, in particular by using chromatic reflective units as disclosed herein.

Further embodiments of the above aspects, are disclosed in the claims, which are incorporated herein by reference.

For example, in some embodiments, the reflective structural unit is based on a mirror structure as disclosed in the above mentioned international patent application PCT/EP2014/059802, which is incorporated herein by reference. In particular, international patent application PCT/EP2014/059802 discloses a mirror with a mirroring surface and a diffusing layer, in front of the mirroring surface that is used, for example, to illuminate an object of an exhibition in a sun-like manner. The diffusing layer preferentially scatters short-wavelength components of impinging light with respect to long-wavelength components of the impinging light. For example, the scattering occurs in the Rayleigh or extended Rayleigh-like regime.

With respect to the chromatic diffusing layer of the reflective structural unit, the present disclosure relates to an optical diffuser as disclosed in WO 2009/156348 A1, filed by the same applicants, as a sky-sun nanodiffuser in the noon configuration. Therein the term "sky-sun nanodiffuser" designates an optical diffuser that simulates the diffusion of the sunlight by the sky in nature. Accordingly, the herein disclosed chromatic reflective unit may relate in some embodiments to an optical nanodiffuser of that type disclosed in WO 2009/156348 A1 that comprises an essentially transparent solid matrix in which a plurality of solid transparent nanoparticles are dispersed, e.g. in a thin film, coating, or bulk material such as sandwich embodiments. In the present description the terms "diffusing layer", "nanodiffuser", and in actively illuminated embodiments "chromatic diffusing layer" designate in general an optical element, which comprises a matrix embedding those (essentially transparent) nanoparticles.

The chromatic diffusing layer is in principle capable of (chromatically) separating different chromatic components of incident light having a broad spectral bandwidth (such as in general white light) according to the same mechanism that gives rise to chromatic separation in nature. Rayleigh scattering is creating, for example, the spectral distribution characteristic of skylight and sunlight. More particularly, the chromatic diffusing layer is capable of reproducing—when subject to visible white light—the simultaneous presence of two different chromatic components: a diffused sky-like light, in which blue—in other words the blue or "cold" spectral portion—is dominant, and a transmitted and by the reflective surface reflected incident light, with a reduced blue component—in other words the yellow or "warm" spectral portion.

Referring to reflecting properties of a chromatic reflective section of the chromatic reflective unit, its structure is such that it achieves—based on the nanoparticles—such a specific optical property that comprises a specular reflectance that is larger in the red than in the blue, and a diffuse reflectance that is larger in the blue than in the red. The optical property can be fulfilled, for example, over at least 50% of the reflective surface section, preferably over at least 70%, or even over at least 90%.

Herein, as defined in the Standard Terminology of Appearance, ASTM international, E 284-09a, the reflectance is in general the ratio of the incident flux to the incident flux in the given conditions. For example, the diffuse reflectance is a property of the respective specimen that is given by the ratio of the reflected flux to the incident flux, where the reflection is at all angles within the hemisphere bounded by the plane of measurement except in the direction of the specular reflection angle. Similarly, the specular reflectance is the reflectance under the specular angle, i.e. the angle of reflection equal and opposite to the angle of incidence. In the context of the present disclosure, for a given wavelength and a given position on the reflective surface section, the diffuse reflectance and the specular reflectance are intended for non-polarized incident light with an incident angle of 45° with respect to the normal to the reflective surface section at the given position. For measurements, the angular size of the detector for the measurement of specular reflection and the angular aperture of the incident beam is selectable in a range as it will be apparent to the skilled person. In particular when considering (white light) low angle diffusers, for example, the angular size of the detector for the measurement of specular reflection and the angular aperture of the incident beam should be configured so that the sensor accepts rays with a reflection within a cone around the reflection axis. In some embodiments, an angular aperture of 2 times 0.9° may be used as disclosed, for example, in BYK-Gartner "Perception and Objective Measurement of Reflection Haze" for hazemeters and glossmeters introduction, Friedhelm Fensterseifer, BYK-Gardner, BYK-Gardner Catalog 2010/2011).

Moreover, the reflected flux is averaged over all possible incidence azimuthal angles. In case the measurement of the diffused reflectance and/or the specular reflectance is hindered by geometrical or other physical constraints related to the configuration of the chromatic reflective unit, the skilled person may have access to the above mentioned quantities by forming at least one separate chromatic reflective section from the chromatic reflective unit and measuring the reflectance directly onto that section. For details of microscopic structural properties, it is referred to, for example, the above mentioned publication WO 2009/156348 A1. However different values of microscopic parameters may be applicable. For example, one may apply parameters that lead to a larger amount of scattered light with respect to non-scattered light. Similarly, in the aim of minimizing or at least reducing the visibility of the specularly reflected scene, one may prefer increasing the contribution to the luminance of the chromatic reflective unit due to diffused light in spite of the fact that the resulting perceived color may depart from the color of a perfect clear sky. The latter may be caused by reducing the level of color saturation as a consequence of the multiple scattering arising therein and may be even caused at concentrations below the concentration giving rise to multiple scattering.

In the following, some microscopic features are summarized exemplarily.

The chromatic effect is based on nanoparticles having a size in the range from, for example, 10 nm to 240 nm. For example, an average size may be in that range.

It is well known from fundamentals of light-scattering that a transparent optical element comprising transparent matrix and transparent nanoparticles having different refraction index with respect to the matrix, and having sizes (significantly) smaller than visible wavelength, will preferentially scatter the blue part (the blue) of the spectrum, and transmit the red part (the red). While the wavelength-dependence of the scattering efficiency per single particle approaches the $\lambda^{-4}$ Rayleigh-limit law for particle sizes smaller or about equal to 1/10 of the wavelength $\lambda$, a respective acceptable optical effect may be reached already in the above range for the size of the nanoparticles. In general, resonances and diffraction effects may start to occur at sizes larger, for example, half the wavelength.

On the other side, the scattering efficiency per single particle decreases with decreasing particle size d, proportional to $d^{-6}$, making the usage of too small particle inconvenient and requiring a high number of particles in the propagation direction, which in turn may be limited by the allowed filling-fraction. For example, for thick scattering layers, the size of the nanoparticles embedded in the matrix (and in particular their average size) may be in the range from 10 nm to 240 nm, such as 20 nm to 100 nm, e.g. 20 nm to 50 nm, and, for compact devices, e.g. using thin layers such as coatings and paints, the size may be in the range from 10 nm to 240 nm, such as 50 nm to 180 nm, e.g. 70 nm to 120 nm.

In some embodiments, larger particles may be provided within the matrix with dimensions outside that range but those particles may not affect the Rayleigh-like feature and, for example, only contribute to forming a low-angle scattering cone around the specular reflection.

The chromatic effect is further based on nanoparticles having a refractive index that is different than the refractive index of the embedding matrix. To scatter, the nanoparticles have a real refractive index $n_p$ sufficiently different from that of the matrix $n_h$, (also referred to as host material) in order to allow light scattering to take place. For example, the ratio m between the particle and host medium refractive indexes $$\left(\text{with } m \equiv \frac{n_p}{n_h}\right)$$

may be in the range $0.5 \leq m \leq 2.5$ such as in the range $0.7 \leq m \leq 2.1$ or $0.7 \leq m \leq 1.9$.

The chromatic effect is further based on the number of nanoparticles per unit area seen by the impinging light propagating in the given direction as well as the volume-filling-fraction f. The volume filling fraction f is given by $$f = \frac{4}{3}\pi \left(\frac{d}{2}\right)^3 \rho$$

with $\rho$ [meter$^{-3}$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions impact also the dependence of scattering efficiency on wavelength, and on angle as well. One may avoid those "close packing" effects, by working with filling fractions $f \leq 0.4$, such as $f \leq 0.1$, or even $f \leq 0.01$ such as $f = 0.001$.

The chromatic effect is further based on a number N of nanoparticles per unit area of the chromatic diffusive layer in dependence of an effective particle diameter $D = d\, n_h$. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified in nm.

In some embodiments:

$$N \geq N_{min} = \frac{2.07 \times 10^{-29}}{D^6} \left|\frac{m^2+2}{m^2-1}\right|^2 \text{ [meters}^{-2}\text{]},$$

(D given in [meters]) and $N \leq N_{max} =$ $$\frac{1.21 \times 10^{-27}}{D^6} \left|\frac{m^2+2}{m^2-1}\right|^2 \text{ [meters}^{-2}\text{]};$$

for example, $$N \geq N_{min} = \frac{4.24 \times 10^{-29}}{D^6} \left|\frac{m^2+2}{m^2-1}\right|^2 \text{ [meters}^{-2}\text{] and}$$

$$N \leq N_{max} = \frac{9.27 \times 10^{-28}}{D^6} \left|\frac{m^2+2}{m^2-1}\right|^2 \text{ [meters}^{-2}\text{]},$$

more specifically $$N \geq N_{min} = \frac{8.99 \times 10^{-29}}{D^6} \left|\frac{m^2+2}{m^2-1}\right|^2 \text{ [meters}^{-2}\text{] and}$$

$$N \leq N_{max} = \frac{6.48 \times 10^{-28}}{D^6} \left|\frac{m^2+2}{m^2-1}\right|^2 \text{ [meters}^{-2}\text{]}.$$

For example, for embodiments aiming at simulating the presence of a pure clear sky, $$N \geq N_{min} = \frac{2.07 \times 10^{-29}}{D^6} \left|\frac{m^2+2}{m^2-1}\right|^2 \text{ [meters}^{-2}\text{]},$$

(D given in [meters]) and $N \leq N_{max} =$ $$\frac{3.69 \times 10^{-28}}{D^6} \left|\frac{m^2+2}{m^2-1}\right|^2 \text{ [meters}^{-2}\text{]}$$

such as $$N \geq N_{min} = \frac{4.24 \times 10^{-29}}{D^6}\left|\frac{m^2+2}{m^2-1}\right|^2 \text{ [meters}^{-2}\text{] and}$$

$$N \leq N_{max} = \frac{2.79 \times 10^{-28}}{D^6}\left|\frac{m^2+2}{m^2-1}\right|^2 \text{ [meters}^{-2}\text{],}$$

more specifically $$N \geq N_{min} = \frac{8.99 \times 10^{-29}}{D^6}\left|\frac{m^2+2}{m^2-1}\right|^2 \text{ [meters}^{-2}\text{] and}$$

$$N \leq N_{max} = \frac{2.06 \times 10^{-28}}{D^6}\left|\frac{m^2+2}{m^2-1}\right|^2 \text{ [meters}^{-2}\text{].}$$

In other embodiments aiming at minimizing the contribution of a specular reflected scene, $$N \geq N_{min} = \frac{2.79 \times 10^{-28}}{D^6}\left|\frac{m^2+2}{m^2-1}\right|^2 \text{ [meters}^{-2}\text{],}$$

(D given in [meters]) and $N \leq N_{max} =$ $$\frac{1.21 \times 10^{-27}}{D^6}\left|\frac{m^2+2}{m^2-1}\right|^2 \text{ [meters}^{-2}\text{]}$$

such as $$N \geq N_{min} = \frac{3.69 \times 10^{-28}}{D^6}\left|\frac{m^2+2}{m^2-1}\right|^2 \text{ [meters}^{-2}\text{] and}$$

$$N \leq N_{max} = \frac{9.27 \times 10^{-28}}{D^6}\left|\frac{m^2+2}{m^2-1}\right|^2 \text{ [meters}^{-2}\text{],}$$

more specifically $$N \geq N_{min} = \frac{4.85 \times 10^{-28}}{D^6}\left|\frac{m^2+2}{m^2-1}\right|^2 \text{ [meters}^{-2}\text{] and}$$

$$N \leq N_{max} = \frac{6.48 \times 10^{-28}}{D^6}\left|\frac{m^2+2}{m^2-1}\right|^2 \text{ [meters}^{-2}\text{].}$$

With respect to those physical parameters and their general interplay, it is again referred to, for example, WO 2009/156348 A1.

The macroscopic optical properties of the chromatic reflective unit disclosed herein, and in particular a chromatic reflective section, can be described in terms of the two following quantities:

(i) The monochromatic normalized specular reflectance $R(\lambda)$, defined as the ratio between the specular reflectance of the chromatic reflective unit and the specular reflectance of a reference sample identical to the chromatic reflective unit except for the fact that the diffusing layer does not contain the nanoparticles having a size in the range from 10 nm to 240 nm. i.e. the nanoparticles which are responsible of preferentially diffusing the short wavelengths of the impinging radiation.

(ii) The ratio $\gamma$ between the blue and the red optical densities defined as: $\gamma \equiv \text{Log}[R(450 \text{ nm})]/\text{Log}[R(630 \text{ nm})]$ that measures the capacity of the chromatic reflective device to provide chromatic separation between long and short wavelength components of the impinging radiation.

In some embodiments, the chromatic reflective unit, and in particular a chromatic reflective section, may have:

R(450 nm) in the range from 0.05 to 0.95, for example from 0.1 to 0.9 such as from 0.2 to 0.8. For example for embodiments aiming at simulating the presence of a pure clear sky, R(450 nm) may be in the range from 0.4 to 0.95, for example from 0.5 to 0.9 such as from 0.6 to 0.8.

In embodiments aiming at reducing (e.g. minimizing) the contribution of a specular reflected scene, R(450 nm) may be in the range from 0.05 to 0.5, for example from 0.1 to 0.4 such as 0.2 up to 0.3.

With respect to the ratio $\gamma$ between the blue and the red optical densities in some embodiments, $\gamma$ may be in the range $5 \geq \gamma \geq 1.5$, or even $5 \geq \gamma \geq 2$, or even $5 \geq \gamma \geq 2.5$ such as $\geq \gamma \geq 3.5$.

For completeness, regarding the use in an outside environment, inorganic particles suited for this type of application may be those that include but are not limited to ZnO. $TiO_2$, $ZrO_2$, $SiO_2$, and $Al_2O_3$ which have, for example, an index of refraction $n_p=2.0$, 2.6, 2.1, 1.5, and 1.7, respectively, and any other oxides which are essentially transparent in the visible region. In the case of inorganic particles, an organic matrix or an inorganic matrix may be used to embed the particles such as soda-lime-silica glass, borosilicate glass, fused silica, polymethylmethacrylate (PMMA), and polycarbonate (PC). In general, also organic particles may be used, in particular for illuminated configurations having, for example, a reduced or no UV portion.

The shape of the nanoparticle can essentially be any, while spherical particles are most common.

As mentioned above, the nanoparticles and/or the matrix and/or further embedded particles may not—or may only to some limited extent—absorb visible light. Thereby, the luminance and/or the spectrum (i.e. the color) of the light exiting the chromatic reflective unit may only be very little or not at all affected by absorption. An essentially wavelength-independent absorption in the visible spectrum may be acceptable.

Combining the above features of the chromatic diffusing layer with the structural features disclosed herein may allow addressing one or more aspects of the prior art as will be exemplarily described below for various exemplary embodiments.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 3 is an illustration for defining the surface shape of a reflective surface based on the cross-section shown in FIG. 2:

FIGS. 4 to 6 are schematic cross-sections of a sandwich-type configurations of chromatic reflective units:

FIGS. 7 to 9 are a schematic cross-section, a schematic top view, and a schematic 3D-view, respectively, of a panel-based configuration of chromatic reflective units;

FIGS. 12 to 15 are schematic cross-sections of chromatic reflective units providing non-planar reflective surface sections:

FIGS. 16 to 18 are schematic cross-sections of a chromatic reflective unit providing subgroups of reflective surface sections, a chromatic reflective unit providing randomized oriented planar surface sections, and a chromatic reflective unit providing randomized oriented concave surface sections, respectively;

DETAILED DESCRIPTION

Figure 1:
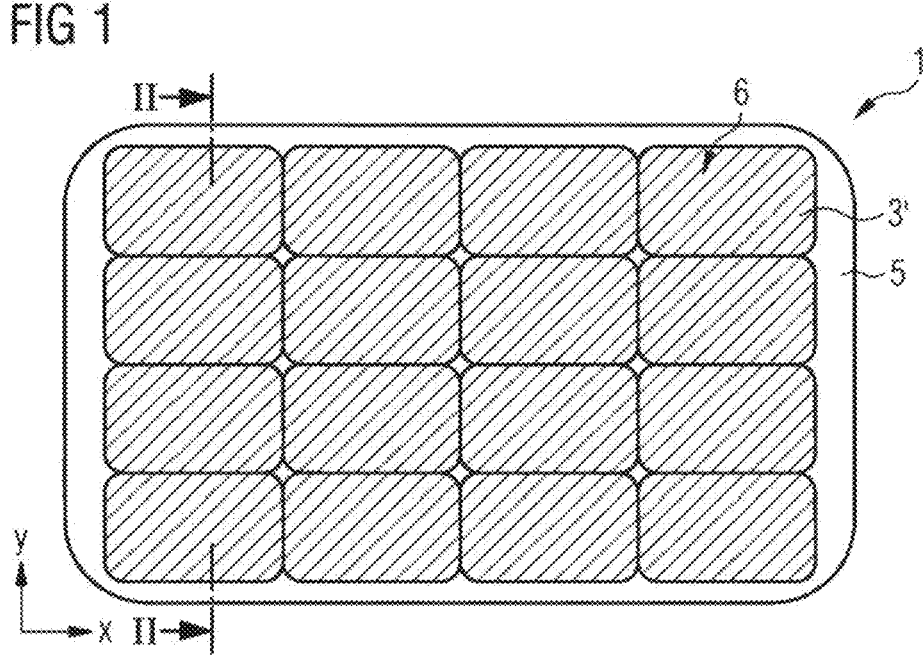
FIG. 1 is a schematic top view of an exemplary chromatic reflective unit with a plurality of reflective surface sections.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that in systems like those described in the above mentioned PCT/EP2014/059802 the specular reflection of a surrounding scene, as for example a scene of a recognizable indoor or outdoor environment or any scene featuring a spatially structured luminance distribution, is superimposed as a background to the blue scattered light. This may result in a degradation of color uniformity and luminance uniformity of light emitted by the device, and therefore also in a spoiling of the desired perception of an infinitely deep sky.

Furthermore, it was realized that for outdoor applications in overcast conditions, where reproducing a bluish clear sky may be desired, a system like those described in the above mentioned PCT/EP2014/059802 may fail or be less effective in generating a bluish luminance for a typical position of observation. Given the fact that outdoors the brightest part of the surrounding scene is typically above the horizon and that an observer usually may look at the device from below, said observer will see—reflected by the system—the most luminous portion of the scene, thus resulting in a yellowish color instead of the desired blue.

The disclosure is based in part on the realization that one can control the visual appearance of a chromatic reflective unit by providing an optical unit that prevents or at least reduces such as minimizes the impact of unwanted contribution to the specular reflected image from the structured luminance distribution of the surrounding scene as that provides a warmer (yellow) contribution superimposed as a background to the colder (blue) scattered light.

It was further realized that the color-spoiling effect of the specular reflection of bright objects in the surrounding scene may be reduced and even overcome, when one reduces the geometric homogeneity of the reflecting surface. For example, providing a random orientation of reflective surface sections will avoid a clear image of a reflected area. Herein, a random orientation of reflective surface sections is understood as not being uniform. For example, in view of the limited number of reflective surface sections, a discrete number of orientations (inclination angles/incident angles) may be selected and the reflective surface sections may be associated individually or in groups to the orientations.

Similarly, providing subsets of reflecting surface sections having essentially identical orientation within a subset but different orientation between subsets similarly may avoid the appearance of a clear reflected image (or provide the same to be viewable at different positions as discussed below). Accordingly, those structures may allow maintaining the specific depth perception that can be provided by chromatic reflective units as disclosed herein.

Furthermore, the disclosure is based in part on the realization that one may increase those observation areas that are subject to the depth perception by providing two or more subgroups of reflective surface sections, each subgroup reflecting an associated portion of the light beam (each incident under a different angle) to another spatially separated observation area. This may allow, for example, a sun-sky-impression for an observer at multiple observer areas.

The disclosure is further based in part on the realization that—by providing a plurality of reflective surface section—one may enlarge and/or focus a reflected area to a respective larger or smaller observation area. Thereby, the sun-sky-impression may be accessible from an enlarged observer area.

The disclosure is further based in part on the realization that a chromatic reflective unit as disclosed herein may work even in absence of directional illumination (such as in absence of direct sun illumination or collimated projected light) and may still produce a realistic and vivid sky and sun appearance, together with a natural depth perception associated to those.

The disclosure is further based in part on the realization that the herein disclosed concepts of a chromatic reflective unit may be able to rely on even a small unbalancing of the whole luminance distribution participating at the illumination of the chromatic reflective unit to contribute to a chromatic output (appearance) of the chromatic reflective unit.

In some embodiments, the chromatic output was realized to convert the gray shades of an overcast sky into a wide distribution of colors that are typical for the sky of a clear or partly clear day, including the warm blue hues of a perfectly clear bright sky and the warmer yellow and red tinges produced by sunlight propagating through a long path in the atmosphere and illuminating e.g. a group of clouds. The chromatic output was further realized to resemble even under essentially overcast weather conditions—as an example of light conditions without a contribution of directional light as associated to sun rays or an illumination by a projector (i.e. as in illuminated configurations) to the illumination of the chromatic reflective unit—the visual appearance of the sky.

The disclosure is further based in part on the realization that the desired performance of the chromatic reflective unit may be realized—in case it is properly configured—in a manner to minimize (or at least to reduce) the spoiling of blue color featuring the scattered light due to warmer contribution of specular reflection of the surrounding scene. This can be achieved by configuring the unit to increase (e.g. maximize) the probability of causing the observer to see reflected images of an area that is typically characterized by a brightness that is lower than the average brightness of the surrounding scene. The configuration may, for example, select the ground as reflected scene. In those embodiments having the chromatic reflective unit installed along a vertical wall at a position above the observer, the chromatic reflective unit may be configured so that the reflecting surface sections are oriented with their normal vectors pointing towards the ground. For example, the normal vectors of the reflecting surface sections may form an average angle of 5°, 20°, 50° with respect to the normal vector of the wall—assuming a planar surface-type, with respect to the normal vector of that surface-type.

The disclosure is further based in part on the realization that one may favorably combine the two components of diffuse light and specular reflected light by providing a specific contribution of the specular reflected light via the reflective surface(s) to the perceived appearance by suitable configuring the reflective surface. For example, with respect to facade embodiments, the inclination may be selected with respect to the vertical, thereby having an area with less luminance contributing to the specular reflection (the ground and objects below the horizon usually having lower luminance than the sky) and emphasizing the blue component created by the complete luminance distribution affecting the chromatic mirror in any direction.

As an example, it may be possible with the chromatic reflective unit used on a large scale to transform an inhomogeneous luminance of a whitish sky (e.g. on a cloudy day) into an inhomogeneous chromatic bluish appearance of the facade of a building. Specifically, this may be possible for those observation directions, which cause the observer to see a specular reflected image of a darker scene. Moreover, it may be possible to transform the same into an inhomogeneous yellowish appearance of the façade for those directions, which allow the observer to see the reflected image of the brighter portion of the scene. In the case of a façade of a building being formed by a chromatic reflective unit as disclosed herein and having the reflective surface sections with their normals oriented towards the ground, an observer standing on the ground, preferentially sees the lower part of the façade emitting toward the observer blue light, while the highest part of the façade, which causes the observer to see the specular reflection of the high bright sky, is seen as emitting toward the observer yellow light. Notably the ratio between the bluish a and the yellowish areas as seen by the observer can be varied by changing the inclination of the reflective surface sections, said ratio increasing with the increase of the angle between the normal of the reflective surface section and the normal to the wall of the building.

In other words, the disclosure is further based in part on the realization that a plurality of chromatic reflective surface sections may be configured (sized and oriented) to provide for a sky-like chromatic separation in the presence of a non-uniform illumination by broad spectrally distributed light, thereby producing an output chromatic and luminance distribution of light resembling the visual appearance of the real sky.

The disclosure is further based in part on the realization that downward guiding of light into canyon-like streets delimited by skyscrapers may be increased by increasing the angle between the normal to the reflective surface sections and the normal of the wall (central plane), this providing an increase in the amount of natural illumination at the ground level. In addition, the removal of the visual canyon feeling may be achieved by changing the appearance of one or more buildings, e.g. causing the building façade to appear similar to the sky. Thus, it was realized that the strong depth effect and natural impression given by the herein disclosed chromatic reflective units may remove or at least reduce the claustrophobic feelings induced by narrow deep streets. Moreover, it may increase the luminous levels at the ground (or in general observer areas in the "shade") and improve the comfort and quality given by the available light.

In the following, various embodiments of a chromatic reflective unit are disclosed in connection with FIGS. 1 to 18. As an exemplary application, the use of chromatic reflective units as facade elements is disclosed in connection with FIGS. 19 to 32. As a further application, the use of chromatic reflective units within active illumination concepts is disclosed in connection with FIGS. 33 to 35. It is noted, however, that features of, for example, the outdoor façade applications may similarly apply to indoor applications. Similarly, features of non-illuminated applications may apply to illuminated applications as will be apparent to the skilled reader.

FIG. 1 shows a top view of a chromatic reflective unit 1 having a plurality of reflective surface sections 3' being covered by chromatic diffusing layer 5. Exemplarily, reflective surface sections 3' in FIG. 1 have a rectangular base shape and are arranged such that chromatic reflective unit 1 also has a rectangular base shape. However, other shapes may be applicable.

As will become apparent from the embodiments described in the following, reflective surface sections 3' may be connected by some type of transition surface sections or may be formed by structurally independent surface sections. Moreover, reflective surface section 3' may be planar surfaces in shape (exemplarily in FIG. 1 x- and y-coordinates are indicated) or may extend in 3D as a 3D-type surface such as a curved or partially curved surface. Reflective surface sections 3' may be formed by applying a reflective layer on a plurality of non-coplanar surface sections of a support structure.

Chromatic diffusing layer 5 comprises a plurality of nanoparticles embedded in a transparent matrix. The nanoparticles and the transparent matrix have a difference in the refractive index. That difference in the refractive index, the size distribution of the nanoparticles embedded in the matrix, and the number of nanoparticles per unit surface area are selected such that a specular reflectance is provided that is larger in the red (in the meaning of longer wavelengths of an incident broad spectrum) than in the blue (in the meaning of shorter wavelengths of an incident broad spectrum), and that a diffuse reflectance is provided by a chromatic reflective section 6 (formed by a combination of a reflective surface section 3' with that section of chromatic diffusing layer 5 being in front of the respective reflective surface section 3') that is larger in the blue than in the red.

Figure 2:
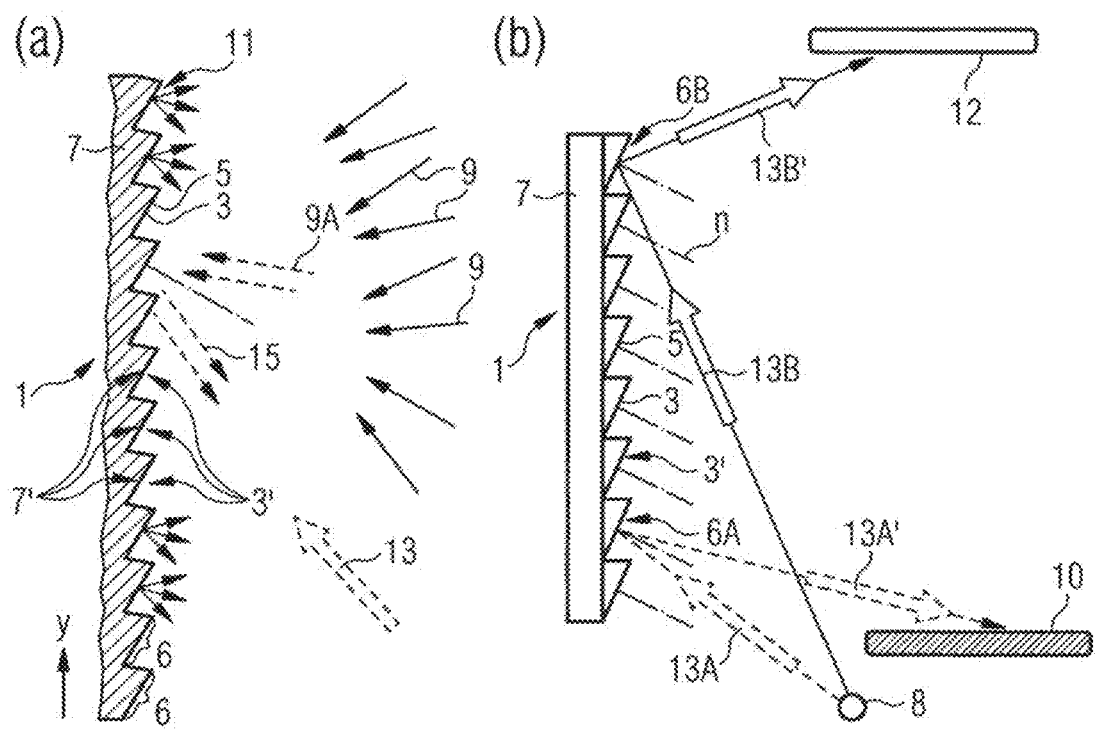
FIG. 2(a) and FIG. 2(b) are schematic cross-sections of the chromatic reflective unit shown in FIG. 1 illustrating the contributions of diffused light and specular reflected light for the appearance.

FIG. 2 shows schematic cross-sections of chromatic reflective unit 1 of FIG. 1 for illustrating the optical features (see section (a) of FIG. 2) and the optical appearance as affected by the specular reflected image (see section (b) of FIG. 2). The cross-section illustrates a saw-like shape being given in the direction of the cross-section, wherein the y-coordinate defines the direction of the cross-section. As can be seen in FIG. 2, reflective surface sections 3' of chromatic reflective sections 6 form in y-direction a sequence of surface sections being regularly displaced with respect to each other in y-direction and are inclined with respect to the y-direction. Accordingly, reflective surface sections 3' indicated in FIG. 2 are non-coplanar with respect to each other as they do not lie in a common plane.

It is noted that neighboring reflective surface sections in x-direction (see FIG. 1) may in principle be coplanar, or a subgroup of the same may be coplanar as will be described below. However, also in x-direction a similar cross-sectional behavior as discussed below may be present.

Referring to FIG. 2, chromatic reflective unit 1 comprises—in a compact configuration—a substrate 7 that is shaped such that the respectively formed and oriented chromatic reflective sections 6 can be provided on its surface. Substrate 7 may be a casted polymeric layer such as foam having a back layer such as metals (e.g. aluminum or steel) and in some cases a layer of PVC may also be added. The provided saw tooth-like bended shape of substrate 7 is transferred to the shape of an applied reflective layer 3.

Reflective surface sections 3' may be sections of a continuous reflective layer 3 such as a reflective coating or a reflective foil provided on substrate 7—acting as a support structure. In some embodiments, the reflective layer may be applied specifically onto respective surface sections 7'. On that reflective layer, chromatic diffusing layer 5 is applied, for example also as a continuous layer. In FIG. 2(a) and FIG. 2(b), reflective layer 3 and chromatic diffusing layer 5 are illustrated by a single line. Each "saw-tooth" of substrate 7 includes a surface section 7', being the basis for a reflective surface sections 3' and, thus, for a chromatic reflective section 6.

Referring to FIG. 2(a), chromatic reflective unit 1 reflects incident light 9 with reflective surface sections 3' after the light having passed chromatic diffusing layer 5 such that specular reflected light has passed chromatic diffusing layer 5 twice. As shown in FIG. 2(a), incident light 9 may be not-directed light that falls onto chromatic reflective unit 1 from the right side in FIG. 2(a).

As discussed above, chromatic diffusing layer 5 is constructed such that it preferentially scatters short-wavelength components of incident light 9 with respect to long-wavelength components of incident light 9. The scattered light is referred herein as diffuse light 11 and it is associated with a blue (short-wavelength) color assuming a given selection of the scattering conditions of the nanoparticles.

In FIG. 2(a), an exemplary viewing direction 13 of an observer is indicated. In viewing direction 13, the observer will see the portion of diffuse light 11 that is emitted in his direction because diffuse light 11 is essentially homogenously emitted in all directions from chromatic diffusing layer 5. Clearly, those portions being emitted towards reflective surface sections 3' are reflected and may also be seen when looking at chromatic reflective unit 1. In addition, the observer sees the transmitted specular reflected light 15 (being "yellow" as discussed above due to the scattering of the blue components). The seen specular reflected light 15 is based on that portion 9A of incident light 9 that is redirected by chromatic reflective unit 1 to face viewing direction 13 of the observer. The redirection may include pure specular reflection as well as the forward scattering addressed before.

As a consequence of the embedded nanoparticles, that portion of incident light 9, which is regularly reflected at reflective surface sections 3' without being deviated by scattering interaction with chromatic diffusing layer 5, has a visible spectrum that differs from the spectrum of incident light 9 in an associated center of mass-wavelength because the spectrum is shifted towards longer wavelengths (i.e. to the red giving a yellow tone). The portion of incident light 9, which is subject to the essentially Rayleigh-like scattering by the nanoparticles, is emitted in a diffuse manner, thereby leading to substantially homogeneous luminance in all the directions pointing away from its surface. It is noted that the diffuse light is based on the complete luminance to which chromatic reflective unit 1 is subjected from any direction. In other words, all light incident on chromatic reflective unit 1 contributes to the diffuse light, irrespective of the direction under which the light is incident.

As a consequence, the light seen when looking at chromatic reflective unit 1 under a certain direction (such as viewing direction 13 in FIG. 2(a)) comprises a superposition of light being specularly reflected and diffuse light generated by the scattering and being scattered towards the respective direction. As will be apparent, an observer looking onto chromatic reflective unit 1 from some viewing angle may have a perception as if the observer looks into the blue sky in case the chromatic separation provided by chromatic reflective unit 1 includes a "dominant" diffuse light component. In contrast, he may have a perception as if he looks into the sun or into an object illuminated by the sun, e.g. bright clouds, in case the chromatic separation provided by the chromatic reflective unit includes a dominant specular reflected component. Accordingly, the luminance of perceived reflected portion 9A of incident light 9 is relevant for the respective color impression perceived by the observer as explained in the following in connection with FIG. 2(b).

Assuming the case of a façade of a building being formed by a chromatic reflective unit as disclosed herein, the orientation of the chromatic reflective unit is shown in FIG. 2(b). Chromatic reflective sections 6A, 6B may be associated with respective normals n. As shown in FIG. 2(b), normals n are oriented towards the ground.

As will be explained below, an observer standing on the ground, i.e. below chromatic reflective unit 1, preferentially sees the lower part of the façade (chromatic reflective sections 6A) as being blueish, while the top part of the façade (chromatic reflective sections 6B)—causing the observer to see the specular reflection of the high bright sky—is seen as being yellowish. It is noted that the ratio between the bluish and the yellowish contributions as seen by the observer may be varied by changing the inclination of the reflective surface sections 3'. The ratio may increase (i.e. more bluish perception) with the increase of the angle between the normal n of the respective reflective surface section 3' and the normal to the wall of the building.

Specifically, an observer (illustrated by dot 8 in FIG. 2(b)) looking in the direction 13A at chromatic reflective section 6A of chromatic reflective unit 1, sees reflected along a direction 13A' of specular reflection a dark object 10, e.g. sees the ground. Consequently, chromatic reflective section 6A appears blue to the observer. In fact, the luminance of chromatic reflective section 6A as seen by the observer along direction 13A has a low contribution due to the specular reflection, i.e. a low yellow (long-wavelength) component. For that reason, the main contribution to the luminance of chromatic reflective section 6A along direction 13A is the contribution of the Rayleigh-like scattered light, i.e. the contribution of the light impinging from any direction onto chromatic reflective section 6A, which is eventually scattered against the direction 13A along which the observer is looking.

In contrast, the observer, when looking in a direction 13B at chromatic reflective section 6B of chromatic reflective unit 1, sees reflected along the direction 13B' of specular reflection a bright object 12, e.g. a luminous over-casted, white sky. Consequently, the luminance of chromatic reflective section 6B along direction 13B has a strong contribution due to the specular reflection, i.e. a strong yellow (long-wavelength) component. For that reason, the main contribution to the luminance of chromatic reflective section 6B as seen by the observer is the contribution of the reflected light. Consequently, chromatic reflective section 6B appears yellow to the observer.

In certain embodiments, the chromatic reflective unit may be sufficiently large or comprise a plurality of abutted chromatic reflective sections 6 to be considered onto a façade so that the following conditions are met:

1. The characteristic of the luminance distribution of the light, which illuminate the chromatic reflective section or the plurality of chromatic reflective sections may change, e.g. in angle and/or intensity over the x-y plane (x-y as defined in FIG. 1). For example, the lower portion of a chromatic reflective unit may be less illuminated than the upper.

2. An observer looking at the chromatic reflective section or the plurality of chromatic reflective sections sees different portions under significantly different viewing angles.

The first and/or the second condition may cause different portions of an chromatic reflective section or different chromatic reflective sections to be seen by the observer in different colors as described above.

FIG. 3 is an illustration for explaining the aspect of the non-coplanar orientation of reflective surface sections 3'.

In general, the shape of a chromatic reflective unit can be associated with a surface-type as in general the shape extends layer-like in two directions. Thus, herein the surface-type is understood as the type of (3D-) surface that a chromatic reflective unit embodies. The surface-type can be of any surface shape such as a planar surface (corresponding to a panel shape of the chromatic reflective unit as illustrated in FIG. 3 in a cross-sectional view) or curved surface (corresponding, for example, to a concave or convex shape of the chromatic reflective unit). The surface-type defines, for example, a planar or curved viewable face of the chromatic reflective unit 1 which is essentially independent of the orientation of the reflective surface sections.

The herein disclosed non-coplanar orientation of the reflective surface sections results, however, to a deviation of their orientation with respect to that surface-type. In general, that deviation can be described using a central plane 17 and a reference plane 19 as introduced below.

In FIG. 3, central plane 17 is indicated. It is representative for the spatial orientation of the non-coplanar reflective surface sections. For example, central plane 17 may be the best fitting plane determined by, for example, the method of linear least squares. As is apparent in view of the reflective feature of chromatic reflective unit 1, central plane 17 has a diffusing layer side 17A facing essentially in the direction of potential incident light. The other side of central plane 17 is a non-illuminated side 17B (in general, non-illuminated side 17B is the side at which the reflective layer limits essentially the propagation of incident light).

Based on central plane 17, a reference plane 19 is selected that is coplanar with respect to a central plane 17 and that is displaced from central plane 17 at diffusing layer side 17A beyond anyone of the plurality of non-coplanar reflective surface sections 3'. Reference plane 19 shown in FIG. 3 is an exemplary plane fulfilling the above conditions. The surface feature of chromatic reflective unit 1 is given by the variation in a distance d between the various points on reflective surface sections 3' and reference plane 19. Exemplary minimum distances 21 for two positions (measured in normal direction to reference plane 19) are indicated in FIG. 3.

In FIG. 3, an exemplary variation in distance d along a straight measurement line in y-direction is schematically indicated as a distance graph 23. With increasing y-position, distance d decreases for reflective surface sections 3' (indicated as section 3' of distance graph 23).

In the saw-like cross-section of chromatic reflective unit 1 shown in FIG. 3, neighboring reflective surface sections 3' are connected by transition surface sections 25. Distance d increases in y-direction for those surface sections 25 as indicated by sections 25' of distance graph 23.

In distance graph 23, several local extrema 27 (local maxima or local minima) indicate the transition of increasing and decreasing sections. As shown, in FIG. 3 distance d increases and decreases at least twice along the measurement line in y-direction. Similarly, the non-coplanar surface configuration is characterized by more than three local extrema (excluding terminal points).

In other words, the shape-analysis of the non-coplanar surface sections with respect to a predefined direction may include the steps: estimating for the reflective surface a best fitting plane with, for example, a linear least squares method; selecting a second plane parallel to the best fitting plane such that the second plane does not intercept with the reflective surface; estimating a distance function of two variables, such as d(x, y), which defines the distance between a specific point (x, y) on the second plane and the intercept with the reflective surface along a straight line orthogonal to the second plane at the point (x, y) (in case of multiple intercepts with the reflective surface, selecting the shortest distance as the value of the distance function d (x, y)); and selecting a section r(q) from d(x, y) wherein the section is the intersection of the distance function d(x, y) with a given plane perpendicular to the second plane. The distance requirement is then that the distance in dependence of the variable q has more than three local extrema (excluding terminal points) for at least one given section r(q).

For completeness, for a panel shaped chromatic reflective unit 1 (planar surface type), the saw-tooth like distance d development may be essentially unchanged and repeat itself over the complete extent of the chromatic reflective unit 1, while for a curved surface type, the distance d development may approach or veer away towards the boarder of the chromatic reflective unit as will be apparent to the skilled person.

Various embodiments of chromatic reflective units 1 with respect to the configuration of the non-coplanar reflective surface sections and the chromatic diffusing layer are exemplary described in connection with FIGS. 4 to 6 for sandwich-type configurations.

In FIG. 4, an embodiment of a chromatic reflective unit IA is shown that comprises a chromatic diffusing layer 5A with a planar front side 31A (or a front side surface extending essentially as the base shape of the chromatic reflective unit) and a respectively shaped back side 31B. Reflective surface sections 3' of reflective layer 3 are non-coplanar as described above. Accordingly, a gap volume 33 extends between planar back side 31B and reflective surface sections 3' that varies in thickness.

In the embodiment of FIG. 4, back side 31B of chromatic diffusing layer 5A extends parallel to front side 31A. Accordingly, chromatic diffusing layer 5A has a back side 31B provided at the side of reflective surface sections 3', while front side 31A will be illuminated by incident light 9 (see FIG. 2).

In the exemplary embodiment of FIG. 4, chromatic diffusing layer 5A is constant in thickness and gap volume 33 may comprise some (essentially transparent) filling such as air or some filling material (indicated by dashed line 35 for the three lower gap volumes 33) such as the material of a nanoparticles 37 embedding matrix 39. In the embodiment of FIG. 4, the number of nanoparticles per unit surface area is maintained constant in y-direction. Depending on the size, a refractive filling material may provide an additional chromatic dispersive effect that—depending on the configuration and viewing distance—may be acceptable.

In alternative embodiments, the chromatic diffusing layer may also extend into gap volume 33, thereby providing an inhomogeneous thickness and an in y-direction varying number of nanoparticles per unit surface area. This may also generate modulations in color that may in some configurations be acceptable, in particular in dependence of the shape of gap volume 33 and the viewing distance.

Similar to FIG. 2, reflective layer sections 3' of FIG. 4's embodiment may be provided on a side of a substrate 7 that is saw-like shaped in cross-section. Reflective layer 3 may be formed on—additionally to reflective layer sections 3'—the transition surfaces between reflective layer sections 3'. However, the transition surfaces do not need to be part of the reflective surface sections, in particular in applications having a preset observation direction, from which an observer cannot see the transition surfaces.

For illustrating a further sandwich-type embodiment, FIG. 5 shows a chromatic reflective unit 1B that comprises a plurality of chromatic diffusing layer sections 41 (of chromatic diffusing layer 5B) being respectively associated and applied on reflective surface sections 3' of the plurality of non-coplanar reflective surface sections.

As indicated in FIG. 5, a thickness of each chromatic diffusing layer section 41 is constant. Accordingly, a respective front side section of front side 31A is essentially oriented like the respective reflective surface section and front side 31A is shaped according to the shape of substrate 7. In FIG. 5's cross-sectional view, the front side sections and the reflective surface sections are exemplarily planar.

Like in the embodiment of FIG. 4, assuming homogeneous physical microscopic properties of chromatic diffusing layer 5B, a homogeneous scattering effect is given for the incident light.

With respect to the manufacturing of chromatic reflective unit 1B, the specific embodiment of FIG. 5 is based on a pair of metal layers 43A. 43B spaced apart by a 45—acting as a support structure. Metal layer 43B forms the basis for the reflective layer sections 3'. The structure of FIG. 5 can be manufactured by deforming an initially planar sandwich structure comprising the metal layers 43A, 43B and polymer 45 in a manner that the required non-coplanar shape is given. Chromatic diffusing layer 5B may be applied before or after deformation.

FIG. 6 shows an alternative embodiment of a chromatic reflective unit 1C. Similar to the embodiment of FIG. 5, the structure comprises—as a support structure—a sandwich of two metal layers 43A, 43B and a polymer 45 as an example of a core layer.

In contrast to the embodiment of FIG. 5, the embodiment of FIG. 6 does not deform the complete sandwich structure but instead imprints a desired surface structure on metal layer 43B. In some embodiments, metal layer 43B may provide the reflective feature, thus be the reflective layer. In other embodiments, a specific reflective layer may be provided on metal layer 43B. The chromatic diffusing layer may be applied before or after imprinting and is not explicitly referenced in FIG. 6. In general, imprinting may allow for a small sized structure in comparison of any mechanical bending such as underlying, for example, FIG. 5's embodiment.

In general, the reflective surface sections may have a lateral extent of at least 0.5 mm. e.g. at least 1 mm such as 5 mm, 10 mm, or more, and/or cover an area of at least 0.5 mm$^2$, e.g. at least 1 mm$^2$ such as 2 mm$^2$, 1 cm$^2$, or more.

Depending on the use. e.g. if the chromatic reflective unit will be illuminated from both sides, also first metal layer 43A may be imprinted and coated to provide the plurality of non-coplanar reflective surface sections.

In summary, sandwich-structures shown in FIGS. 4 to 6 comprise a sequence of surface sections, in particular formed on an illumination-sided stabilizing layer, that are inclined with respect to the base surface-shape of the chromatic reflective unit, and form the basis for the reflective surface section and the chromatic diffusing layer provided thereon.

As mentioned above, chromatic diffusing layer 5 may be a coating or film that has a thickness of, for example, about 0.2 mm or less such as 0.1 mm or less or even 0.05 mm or less. Moreover, the coating or film may be deposited onto the reflecting surface sections prior or after providing their respective non-coplanar shape.

For completeness, in addition to nanoparticles 37, larger light-scattering centers may be embedded within the chromatic diffusing layer or, for example, the filling material of gap volume 33. Those additional light-scattering centers may have an average size larger than Rayleigh-active nanoparticles 37, for example in the range of 1 µm or more such as larger than about 5 µm. The additional light-scattering centers may provide—in addition to the above discussed Rayleigh-like diffuse scattering by Rayleigh-active nanoparticles 37—a blurring effect that effects the specular reflected component to be deviated from the pure specular reflection in a forward "scattering" cone.

As will be apparent to the skilled person, an analogue blurring effect may be generated by providing micro-roughness on the chromatic diffusing layer, for example, on the illumination side and/or by providing the reflective surface, instead of with a perfectly glossy finishing, with a rough finishing (such as those available in commercial products such as some type of coil-coated high-reflective metal sheets) configured to provide diffusion of reflected light within a cone of about 3° or more such as 5° or more or even 10° or more.

Methods for applying the reflective layer and/or the chromatic diffusing layer include metal vacuum deposition, molecular beam epitaxy, plasma coding, spraying, inkjet methods, film splitting, or the like.

In some embodiments, a metal layer can be used as reflective layer such as an aluminum metal mirror foil with reflectivity larger than 95% or even larger than 98%.

FIG. 7 illustrates a modular configuration of a chromatic reflective unit 1D. Modular units may in particular be relevant for outdoor application, where they are mounted to a building. In that context, chromatic reflective units are also referred to herein as chromatic reflective structural units in reference to their use at a building structure. Modular embodiments may allow the formation of large scale chromatic reflective units.

Chromatic reflective unit 1D comprises a mounting structure 49 with a series of mounting protrusions 49A. Mounting structure 49 may provide a back frame to be mounted, for example, to a wall of a building.

In some embodiment, mounting structure 49 may extend grid wise in an x-y-direction. Accordingly, a normal 51 to the x-y plane characterizes a viewable face 50 of the surface base shape (in this case panel shape) of chromatic reflective unit 1D.

A sequence of chromatic mirror units 53 are mounted to mounting protrusions 49A. The mounting is performed such that each chromatic mirror unit 53 is inclined with respect to viewable face 50. Specifically, as indicated in FIG. 7 a panel normal 55 of each mirror unit 53 is inclined by an inclination angle α in (negative) y-direction with respect to normal 51.

The chromatic mirror units 53 are displaced with respect to each other in y-direction and are oriented with respect to normal 51 in essentially identical manner.

Each chromatic mirror unit 53 comprises a reflective surface section covered by a chromatic diffusing layer section. Accordingly, the reflective surface sections contribute to a non-continuous reflective surface of chromatic reflective unit 1D.

Figure 8:
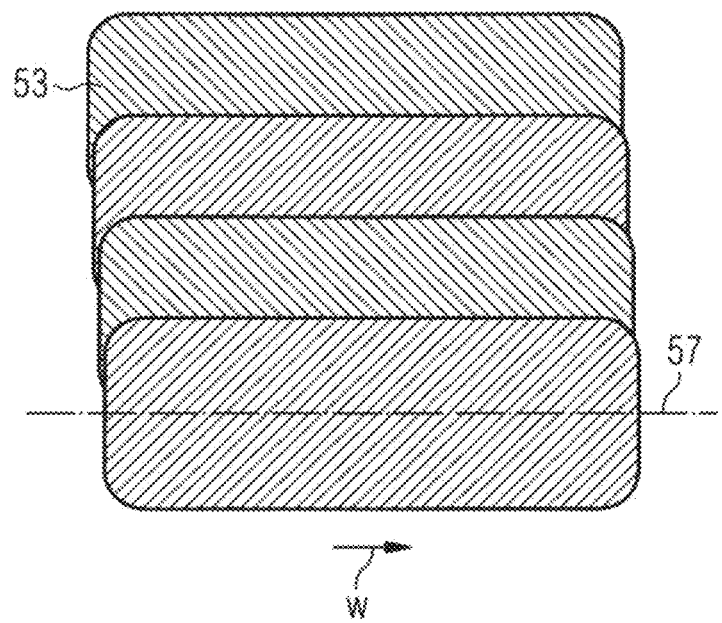

Referring to FIG. 3, also for chromatic reflective unit 1D, central plane 17 can be determined, in this embodiment extending through the center lines 57 indicted in FIG. 8 for one of the chromatic mirror units 53. Furthermore, also reference plane 19 can be selected in the required manner and a distance graph 23' of a non-continuous development of the distance of the reflective surface sections with respect to reference plane 19 is given. Again, more than three local extrema 27 are associated with the specific 3D-shape of the non-coplanar reflective surface sections provided by chromatic mirror units 53 of chromatic reflective unit 1D.

FIG. 8 shows a top view of a set of exemplary four chromatic mirror units 53 of chromatic reflective unit 1D under a viewing angle. As illustrated, the viewing angle does not allow seeing each chromatic mirror unit 53 completely because some portion of the same are covered by the neighboring one. Accordingly, when looking at chromatic reflective unit 1D under the viewing angle, an observer will see a continuous mosaic-like surface comprised of portions of chromatic mirror units 53, i.e. portions of reflectors covered by chromatic diffusing layer sections.

FIG. 8 illustrates further a rectangular base shape for the chromatic mirror units 53, wherein the corners are curved for improving the illustration. However, also, for example, rectangular corners may be provided.

Figure 9:
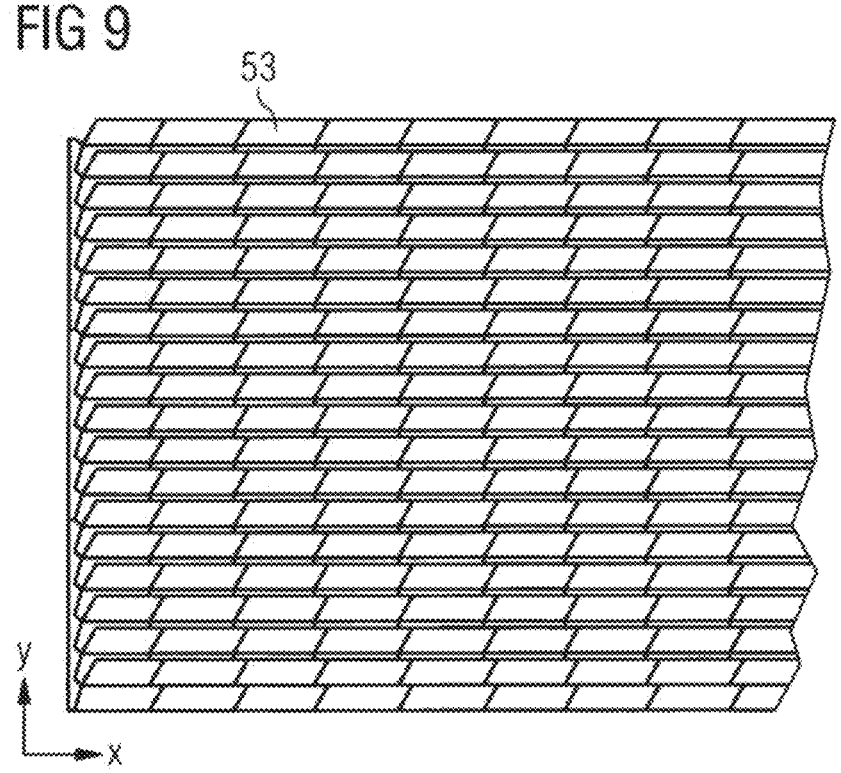

FIG. 9 illustrates a schematic 3D-view of chromatic reflective unit 1D. As can be seen, chromatic mirror units 53 form a sequence in y-direction as well as in x-direction. Accordingly, chromatic reflective unit 1D extends in x-y-direction over, for example, rectangular areas of several meters in x- and y-direction. The latter allows the formation of facade elements as discussed below.

FIGS. 7 to 9 illustrate an embodiment where at least a subgroup of the plurality of non-coplanar reflective surface sections is formed by a sequence of reflective surface sections having essentially an identical shape and an identical orientation in space. Thereby, the subgroup's reflective surface sections are displaced with respect to each other to form a mosaic-like assembly of reflective surface sections.

As chromatic reflective unit 1D comprises a surface-like base shape with viewable face 50, and the reflective surface sections themselves have surface-like shapes characterized by a width direction and a height direction, the embodiment of FIG. 7 illustrates that essentially a width direction w of the reflective surface sections extends along viewable face 50 (specifically along x-direction), while a height direction h extends under an inclination angle with respect to viewable face 50, i.e. out of the x-y-plane.

Chromatic mirror units 53 may each comprise a reflective surface section covered by a chromatic diffusing layer section.

In some embodiments, each reflective surface section is provided on a support board such as a planar plastic, such as polymeric, or glass board and has supplied thereon the chromatic diffusing layer section; all support boards together with, for example, mounting structure 49 may be considered as defining a support structure providing non-coplanar surface sections. In other embodiments, the chromatic diffusing layer section is configured strong enough to act as the support for the reflective layer; then all chromatic diffusing layer sections together with, for example, mounting structure 49 form a support structure providing a plurality of non-coplanar surface sections on which a reflective layer is formed.

Figure 10:
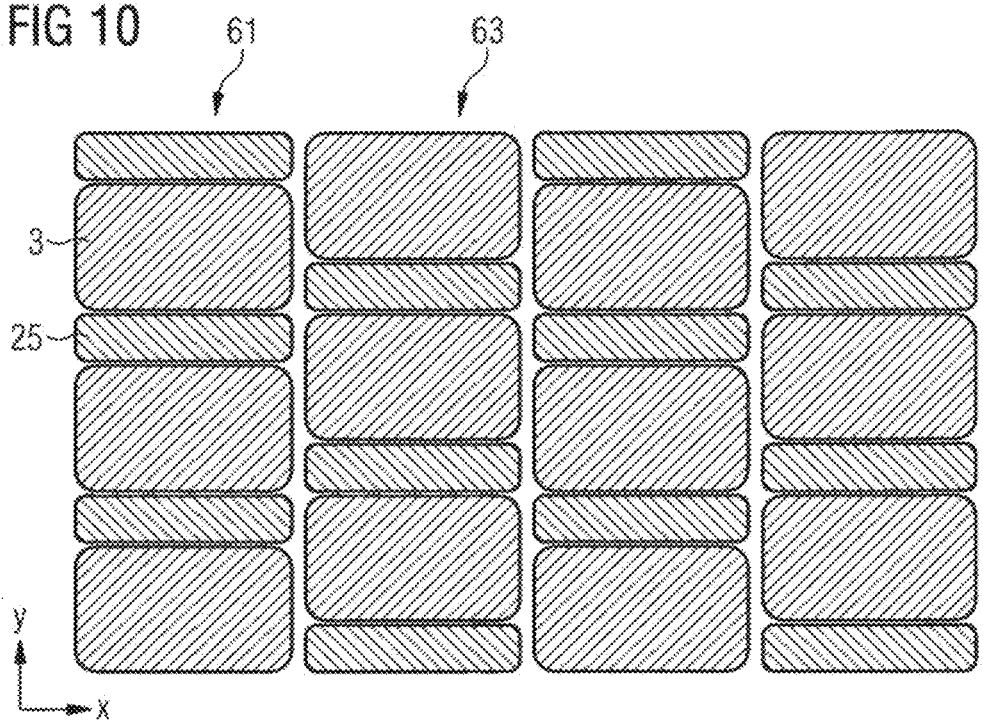
FIGS. 10 and 11 are schematic top views illustrating exemplary arrangements of a plurality of reflective surface sections.
Figure 11:
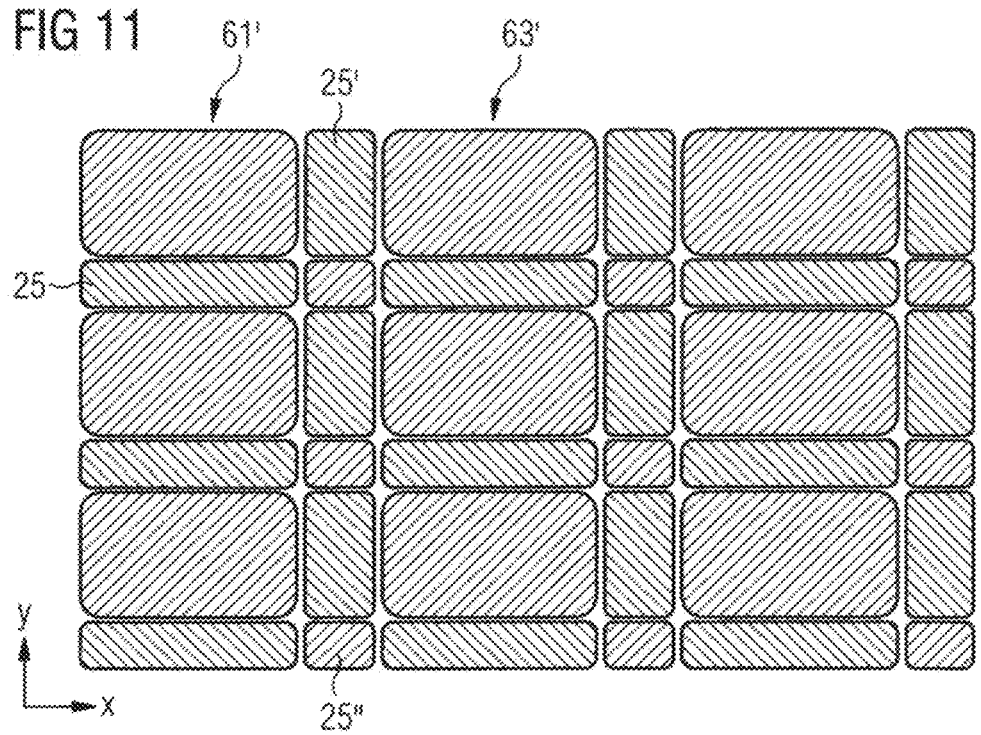

FIGS. 10 and 11 are schematic top views illustrating exemplary arrangements of a plurality of reflective surface sections. Specifically. FIG. 10 illustrates an embodiment for an imprinted surface structure that comprises sequences of reflective surface sections 3' that are separated by transition surface sections 25 in y-direction. In y-direction displaced reflective surface sections 3' form a first subgroup 61 of reflective surface sections that may have a first type of inclination. Shifted in x-direction, a second subgroup 63 of reflective surface sections 3' may provide a sequence having reflective surface sections with a different inclination. Shifted again in x-direction, there is a further subgroup of reflective surface sections 3' that extends in y-direction and may differ again in inclination or have one of the inclinations of the previous subgroups 61, 63.

Accordingly, the embodiment of FIG. 10 illustrates the possibility to form a mosaic-like structure with a variety of different subgroups of reflective surface sections having identical or different orientation in space.

The embodiment of FIG. 11 has additionally transition surfaces in between rows (subgroups, sequences) such as exemplary shown transition surface sections 25' and 25" between subgroup 61' and subgroup 63'. The additional transition surface sections may be caused by the respective manufacturing process and may contribute themselves to the scattering/reflection features, thereby, for example, supporting the breaking up of any reflected image.

In summary, referring to FIGS. 10 and 11, the plurality of reflective surface sections may be orientated with respect to the surface base shape to form a step-like sequence of reflective surface sections having identical and/or varying step shapes including identical and/or varying sizes, angles, and shapes—such as plane or curved shapes discussed below.

FIGS. 12 to 15 are schematic cross-sections of chromatic reflective units illustrating embodiments with non-planar reflective surface sections.

Specifically, FIG. 12 shows an alternative to the embodiment of FIG. 7 wherein, in a modular configuration, the planar chromatic mirror units 53 of FIG. 7 are replaced by concave mirror units 53A—having, for example, a configuration as described above in connection with FIGS. 7 to 9. The concave shape is given in the plane of the cross-section given by the y-direction, while the shape in the x-direction (or generally along another direction defined by the surface-like base shape of the chromatic reflective unit) may be un-curved or follow the respective surface-like base shape. As will be apparent to the skilled person, the concave shape results in a (one-dimensional) focusing feature of each chromatic mirror unit and, thus, the chromatic reflective unit in general. For example, the configuration of FIG. 12 can focus an illuminating light beam in one direction.

In contrast, the embodiment of FIG. 13 uses convex chromatic mirror units 53B. Convex chromatic mirror units 53B may have, for example, a configuration as described above in connection with FIGS. 7 to 9 and cause a defocusing and accordingly associate, for a specific observer position, a viewing direction 13 (see FIG. 2) with a plurality of directions of the incident light 9. Thereby, a broadening of the reflected light beam in case of directional illumination (e.g. sun illumination), and hence a smoothing of the illuminance on the ground may be achieved.

FIGS. 14 and 15 illustrate, for sandwich-type configurations, embodiments similar to the ones of FIGS. 12 and 13. In principle, sandwich-type configurations, and in particular surface imprinted structures, allow a very flexible formation of non-planar reflective surface section. The non-planar shapes may generally be varied in x- and/or y-direction or generally over the complete viewable face 50. Thereby, on a small scale, a mosaic-like structure can be provided with the optical effects discussed in connection with FIGS. 12 and 13.

FIGS. 16 to 18 illustrate the flexibility that is available for orienting reflective surface structures for modular configurations and sandwich-type configurations.

For example, FIG. 16 illustrates an embodiment in which chromatic mirror units 53C are inclined with respect to y-direction in a random manner. The random orientation of the various chromatic mirror units 53C provides for a breaking of the mirrored image because an observer sees, for a specific viewing direction, various sections of the incident light (see also discussion in combination with FIG. 23).

A more regular configuration of chromatic mirror units is shown in FIG. 17, which includes alternating subgroups 65A, 65B in y-direction, each having a respective orientation/inclination. Thereby, configurations are possible that specifically link a viewing direction with two regions of the incident light. In illuminated configurations with essentially a single incident direction, this aspect allows to provide the sky-sun impression at various observer locations.

FIG. 18 illustrates a configuration in which a random-like orientation is combined with a concave configuration of the reflective surface sections 3A'. The embodiment combines the aspect of focusing (or alternatively defocusing) with the effect of randomness.

FIG. 18 illustrates further the concept of an associated (section) normal na for curved surface sections—in analogy to planar surface normals (which are considered to be an associated normal within the herein disclosed concepts). In principle, for an incident beam, also a curved surface will generate a reflected beam that can be associated with a main beam direction after the reflection. That main beam direction and incident beam direction define the associated normal. As shown in FIG. 18, also for a random-like orientations, the associated normal na are non-parallel. If the maintenance of some beam like behavior is intended, a range of possible directions into which the associated (section) normals na point may extend around a subgroup inclination angle. The subgroup inclination angle refers herein to those reflective surface sections that are contributing the visual perception and relates to the surface type of the chromatic reflective unit. The subgroup inclination angle may be in the range from, for example, about 2° to about 88°, in particular in the range from about 5° to about 60° such as in the range from about 10° to about 30°. In general, associated normals na are inclined with respect to a unit normal that is associated with a respective portion of a surface-type of the chromatic reflective unit by inclination angles. For a given inclination direction (e.g. x or y direction or any other direction relating to the surface type), inclination angles of the associated normal na may be within an angular range up to, for example, about 30° with respect to the subgroup orientation direction such as within an angular range of up to about 20°, 10°, or 5°. In some embodiments, inclination angles of the associated normal na may not be limited with respect to the subgroup orientation direction, thereby allowing implementations for a larger potential incident angles of, for example, an incident light beam emitted by a light source.

For example, the inclination angles associated with respective chromatic reflective sections in FIGS. 12 to 18 may be in the range from about 2° to about 80° such as in particular in the range from about 10° to about 40°.

Moreover, the above discussed configuration illustrate the possibility to provide—with respect to a single one of the respective surface sections or with respect to a plurality of reflective surface sections—a constant or varying scattering characteristic, a constant or varying nanoparticle distribution, and/or a constant or varying inclination angle of the reflective surface sections. Those aspects affect the chromatic feature of the chromatic reflective units for specific viewing directions.

In the following, exemplary application of chromatic reflective units are described, in particular with respect to outdoor concepts and indoor concepts. In general, the herein described chromatic reflective units may extend over areas of several square centimeter (e.g. for illumination configurations), up to several 100 square centimeter, up to even several square meter (e.g. for facade configurations).

Figure 19:
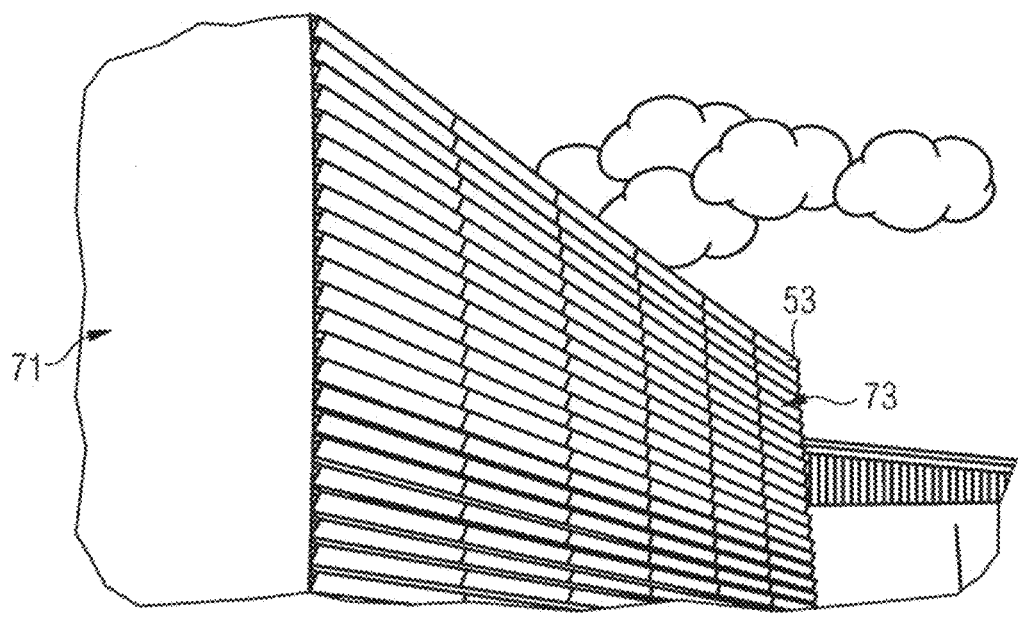
FIG. 19 is a schematic illustration of a top portion of a building having a facade element based on chromatic reflective units for an overcast weather condition.
Figure 20:
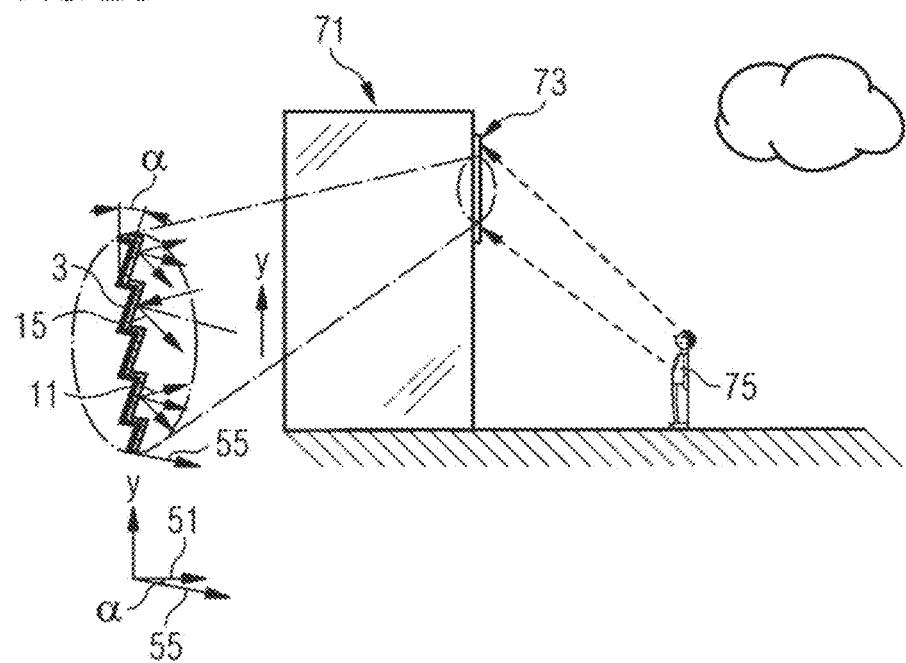
FIG. 20 is a schematic side view of the building of FIG. 19 for illustrating the optical impression from within an observer region.

A facade application is explained in connection with FIGS. 19 to 31. As shown in FIG. 19, a top section of a building 71 is covered by chromatic reflective structural units 73 each comprising a plurality of chromatic mirror units 53. The configuration of FIG. 19 is schematically illustrated in FIG. 20 in a side view. Specifically, at top section of building 71, structural units 73 are mounted and configured to provide a chromatic effect for an observer 75 looking towards the structural unit 73 from, for example, the ground.

In such an outdoor configuration, structural units 73 are a measure to affect the visual appearance of building 71 by using the chromatic feature under natural illumination. The natural illumination may include cloudy weather conditions such as shown in FIG. 19 and discussed in connection with FIGS. 22 and 23 as well as partly sunny conditions such as shown in FIG. 21.

Referring to FIG. 19, the various chromatic mirror units 53 will be perceived as having a bluish color with varying blue tones and purity levels, even in case of a cloudy day—see the above description in connection with FIG. 2(*b*).

As illustrated at the left side of FIG. 20, observer 75 sees diffuse light 11 generated by the chromatic diffusing layer as well as specular reflected light 15 originating from an area in the sky defined by the viewing angle on the respective reflective surface section of each chromatic mirror unit 53. The sum of both light components, the blue diffuse light and the yellow reflected light, defines the color perceived for the respective reflective surface section.

Figure 21:
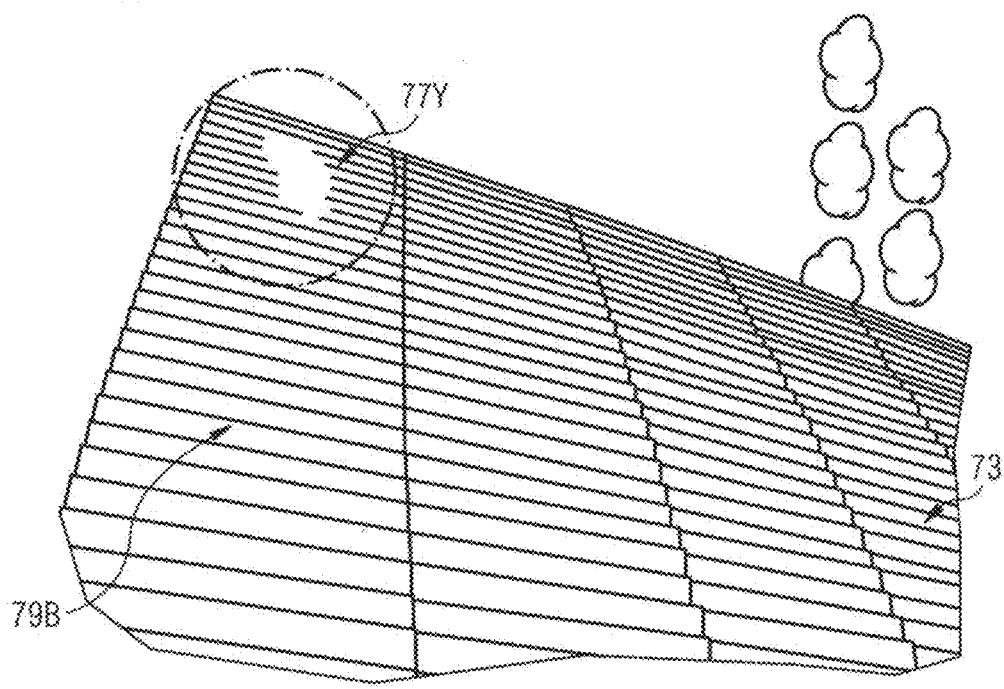
FIG. 21 is a further view of the building of FIG. 19 for a partly sunny sky.

Referring to FIG. 21, a partly sunny day is illustrated. An observer sees a portion 77Y of structural units 73 that is dominated in appearance by the reflected sunlight and that is perceived yellow, like the sun. Region 79B around the yellow dominated portion 77Y is perceived, however, blueish in color in a sky-like appearance.

As will be apparent to the skilled person, the luminance of structural units 73 effects also the illumination conditions on the streets or inside of neighboring buildings when the downwards guided/reflected light is entering rooms through windows. The herein disclosed structural configurations may increase the illumination and may remove or at least reduce the narrow impressions created by skyscrapers and tall buildings in general.

As explained below in detail, the chromatic reflective units are sensitive to an anisotropy of the outdoor illumination that is transferred into an inhomogeneous chromatic appearance of a building.

Figure 22:
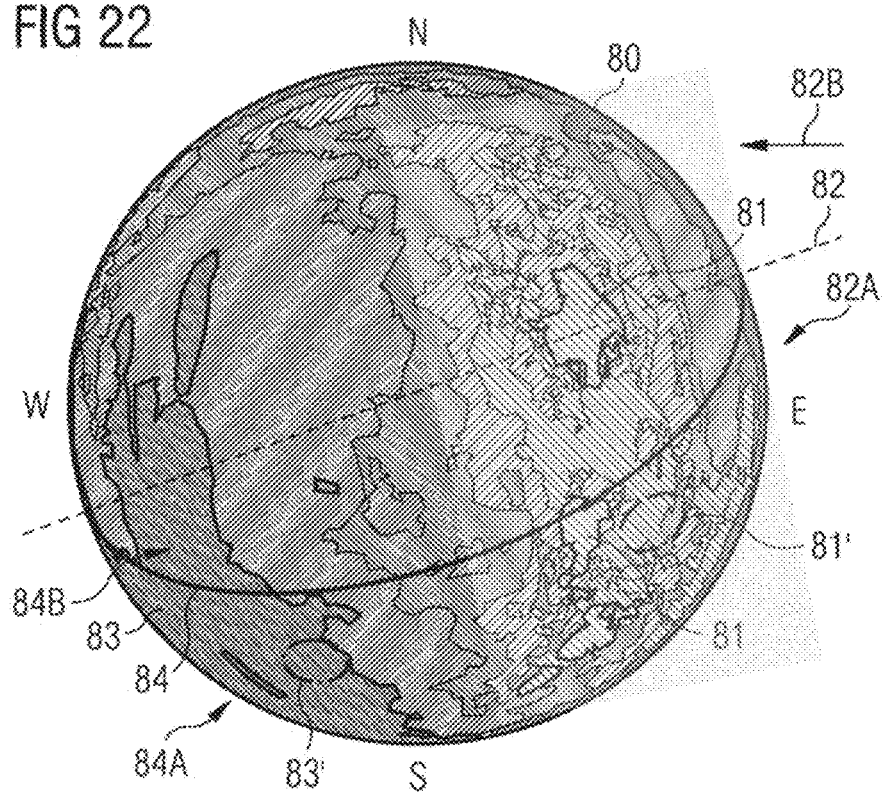
FIGS. 22 and 23 are schematic drawings illustrating an inhomogeneous luminance of the sky for a clouded day and its effect on the visual appearance of a chromatic reflective unit.
Figure 23:
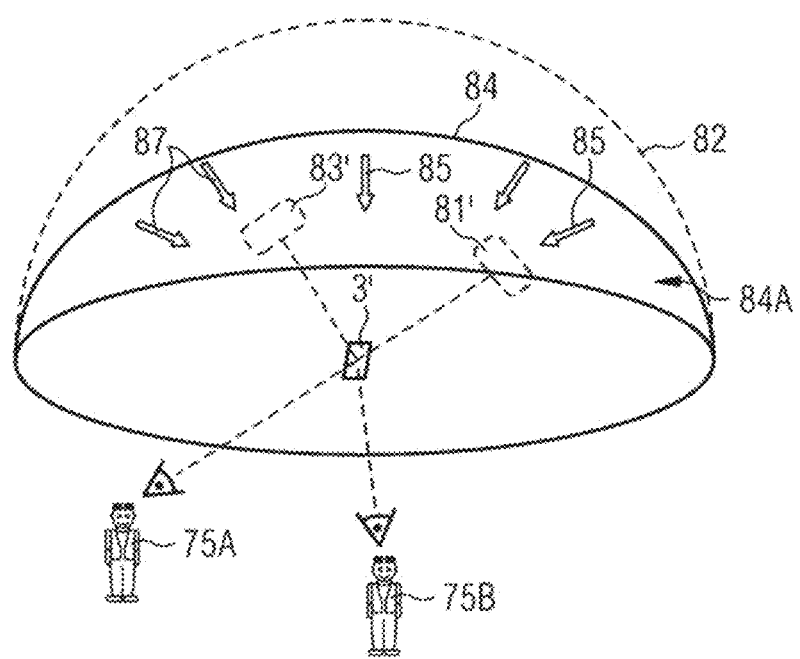

FIGS. 22 and 23 are schematic illustrations for inhomogeneous luminance conditions of the sky for a clouded day. Specifically, FIG. 22 illustrates a two-dimensional scan of the hemispherical sky luminance distribution by a luminance meter. Despite the effect that one does not see the sun and the sky appears generally white, the sun will provide for an increased luminance at some brighter portions 81 of the sky hemisphere while other darker portions 83 may have a rather low luminance. In general, the portions close to the horizon 80 and the northern part of the sky hemisphere are reduced in luminance.

With respect to a vertical orientation of a reflective surface section of a chromatic reflective unit mounted in the outdoor, the vertical plane containing dashed line 82 separates the hemisphere in two halves 82A and 82B. Only half 82A (i.e. essentially the part of the sky hemisphere in FIG. 22 extending from 80° over S to 260°) would contribute to illuminating the chromatic reflective unit. In addition, the ground extending from below the chromatic reflective unit to horizon 80 would contribute to illuminating the chromatic reflective unit As proposed herein, inclining the orientation of the reflective surface section of the chromatic reflective unit, for example by 30° as schematically indicated in FIG. 22, reduces the contribution of the sky hemisphere as indicated by a solid line 84. Only a portion 84A of the sky hemisphere (see for clarity the indication of the complementary portion 84B) contributes to illuminating the chromatic reflective unit. Portion 84A is smaller than half 82A and comprises usually some of brighter portions 81 and darker portions 83. While the contribution of the sky hemisphere is angularly reduced, some "ground" contribution may instead generally be gained. Those gained "ground" contributions usually relate to the chromatic reflective unit which extends towards the ground. For example, light originating from transition section 25 in FIG. 3 may illuminate the above laying reflective surface sections 3'.

As mentioned before, the luminance of the ground is generally reduced with respect to the luminance of the sky hemisphere.

FIG. 23 illustrates the luminance by the size of arrows associated with various directions when looking at portion 84A of the sky hemisphere via a single reflective surface sections 3' of a chromatic reflective unit. For example, arrows 85 relate to brighter (high luminance) portions 81 while arrows 87 relate to darker (low luminance) portions 83. If a chromatic reflective section 3' of the chromatic reflective unit, in particular a reflective surface section, is looked at under an observation angle that reflects light from a bright region 81' of brighter high luminance portions 81 into the eye of an observer 75A, more yellow, warmer light will be superimposed onto blue diffuse light 11. Thereby, an observer 75A will see light coming from reflective surface sections 3' with a color shifted from blue (pure Rayleigh contribution) to lighter blue (i.e. with lower color purity, drifted to white), or even progressively to white and yellow.

On the other side, an observer 75B may look via the reflection at reflective surfaced section 3' of the chromatic reflective unit in a direction that points to a darker region 83' of low luminance portions 83, the respective chromatic reflective section appears in a blue color with higher purity (with respect to the case of observer 75A) because of less white/yellow light being superimposed onto diffuse blue light 11.

Accordingly, positioning reflective surface sections in an orientation in space such that they reflect less luminance portions 83 may increase the color blue. In the facade embodiment of FIGS. 19 and 21, chromatic mirror units 53 of structural units 73 face, for example, down to earth having an in general lower luminance than the sky.

Figure 24:
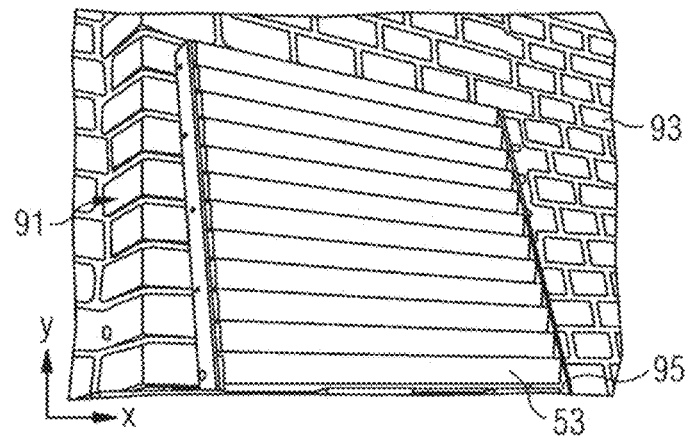
FIG. 24 is a schematic illustration of an exemplary facade element with a sequence of inclined mirror units forming a chromatic reflective structural unit.
Figure 25:
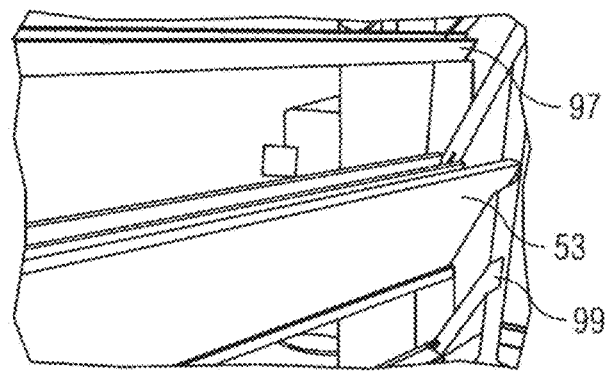
FIG. 25 is a detailed view illustrating the mounting of a mirror unit of the façade element of FIG. 24.
Figure 26:
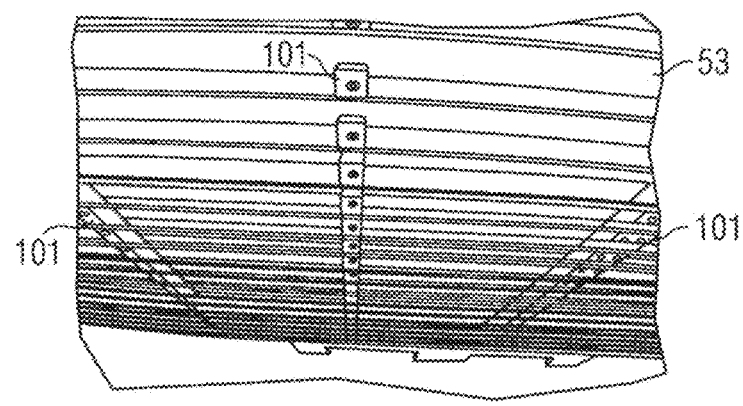
FIG. 26 is a schematic illustration of an alternative mounting configuration of mirror units for a chromatic reflective structural unit.

In connection with the FIGS. 24 to 26, an exemplary configuration of a structural unit 91 is mounted to a wall 93 is illustrated. As shown, chromatic mirror units 53 are inclined with respect to the normal of the wall (corresponding to the normal of the viewable side of structural unit 91) by being mounted under the respective angle via a mounting structure 95. Thereby, an observer's potential field of view includes specular reflected light from a lower portion of the sky hemisphere and the ground when looking up to structural unit 91.

In the embodiment of FIG. 24, chromatic mirror units 53 are a plurality of elongated plane (chromatic) mirrors mounted on mounting structure 95 as a mechanical support. Accordingly, a sequence or an array of reflective surface sections with vertical development is formed. From an observation point at the ground or lower levels, the mounting structure may, for example, be hidden behind mirrors. Looked at from the ground, structural unit 91 extends then as a continuous reflector on wall 93. Accordingly, the array of plane mirrors are configured to, from a perceptional point of view, be considered as continuous viewable face although having a modification in color due to the inhomogeneous luminance of the surrounding.

FIG. 25 illustrates a specific mounting configuration of elongated chromatic mirror units 53. Specifically, chromatic mirror units 53 are mounted to linear guiding tracks 97 (extending in x-direction) and respective slots at side wall 99 of mounting structure 95. The inclination together with the height of chromatic mirror units 53 defines the thickness of structural unit 91. Mounting structure 95 and chromatic mirror units 53 are made such that the various plane chromatic mirror units 53 are safely secured at the wall and fulfil building requirements.

Figure 27:
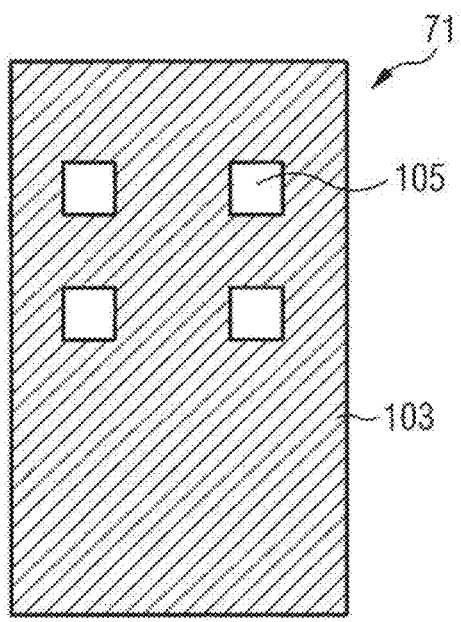
FIG. 27 to FIG. 29 illustrate various mounting configurations of chromatic reflective structural unit on a building.
Figure 28:
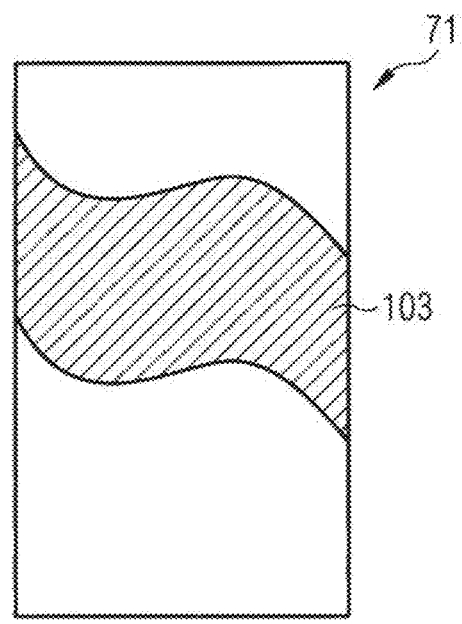
Figure 29:
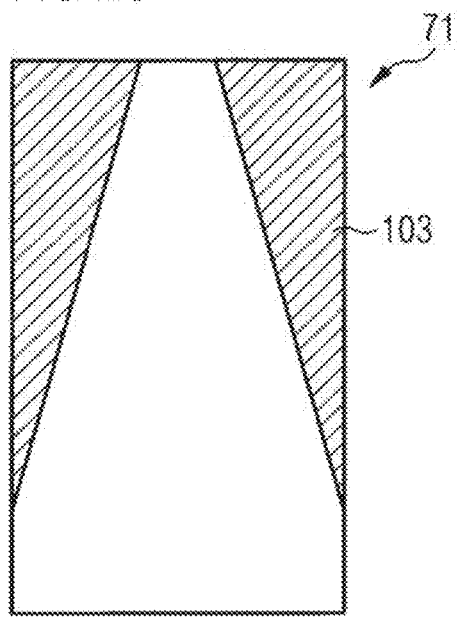

FIG. 26 illustrates an alternative mounting configuration that is based on a sequence of vertically extending bars 101 having angled slots therein into which chromatic mirror units 53 are screwed. Bars 101 enable the formation of large facade structures that are easily mountable to building In connections with FIGS. 27 to 29, it is illustrated that the wall of building 71 can be completely (FIG. 27) or partially (FIGS. 28 and 29) be covered with structural units 91. In FIGS. 27 to 29, the shaded areas 103 are provided with structural units 91 such as exemplarily shown in FIG. 24 or 26. In the configuration of FIG. 27, a complete wall with the exception windows 105 will be covered and therefore be affected in its appearance by the chromatic effect. In the configuration of FIG. 28, the appearance of building 71 is cut into parts. Alternatively, the perceived shape of building 71 can be altered, for example, in a pointing manner as illustrated in the configuration shown in FIG. 29.

Figure 30:
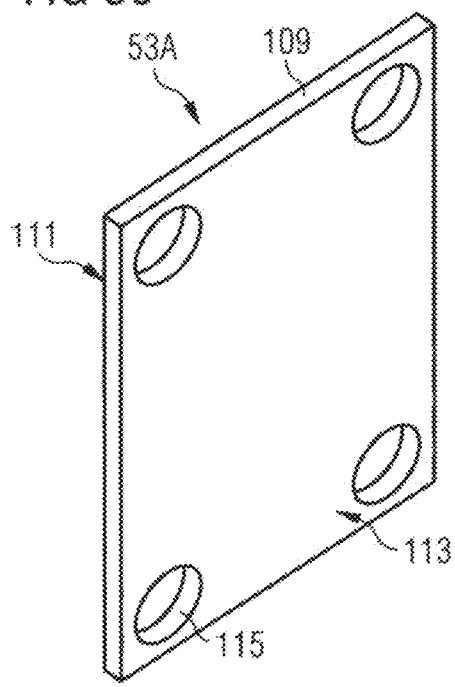
FIG. 30 is a schematic illustration of a glass panel based mirror unit.
Figure 31:
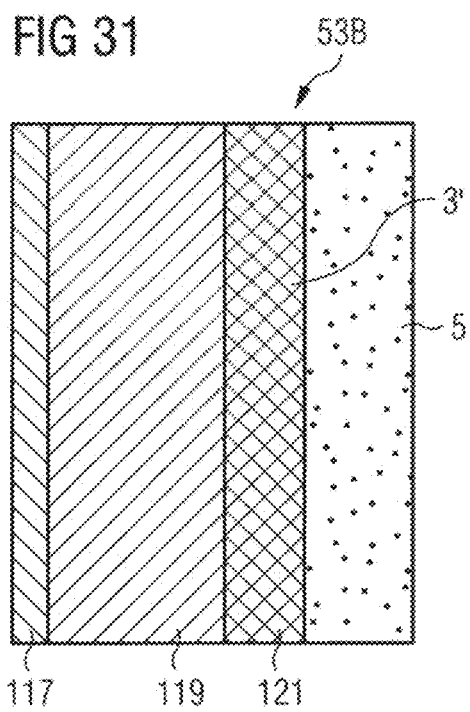
FIG. 31 is a schematic illustration of a sandwich based mirror unit.

FIGS. 30 and 31 show exemplary embodiments of panel shaped chromatic mirror units 53 as they can be used in chromatic reflective units such as shown in FIG. 7 or FIG. 24 the latter as a general example of frame based modular structural units.

FIG. 30 illustrates a glass panel based chromatic mirror unit 53C. The glass panel 109, for example a safety glass panel, forms a part of the support structure of a chromatic reflective unit and has a reflective layer 111 applied on one side and a chromatic diffusing layer 113 applied on the other side. The mirror unit may comprise, for example, through holes 115 for attaching the mirror unit to a grid configured for mounting mirror unit 53 under the desired inclination.

In alternative embodiments, glass panel 109 may be replaced by transparent panels made of, for example, a polymeric, e.g. an acrylic, polycarbonate, PVC or the like material. Respective non glass materials may simplify the mounting and reduce the weight of chromatic mirror unit 53C.

In FIG. 31, a further alternative configuration of a sandwich structure based mirror unit 53D is shown. Mirror unit 53D comprises a mount-sided stabilizing layer 117, a core layer 119, and an illumination-sided stabilizing layer 121 thereby forming a composite panel such as an aluminum composite panel that forms a part of the support structure of a chromatic reflective unit. The reflective layer sections 3' may be provided by the illumination-sided stabilizing layer itself (e.g. by an aluminum layer) or they may be applied separately thereon by a reflective layer. Chromatic diffusing layer 5 is then applied onto illumination-sided stabilizing layer 121 or that reflective layer.

Figure 32:
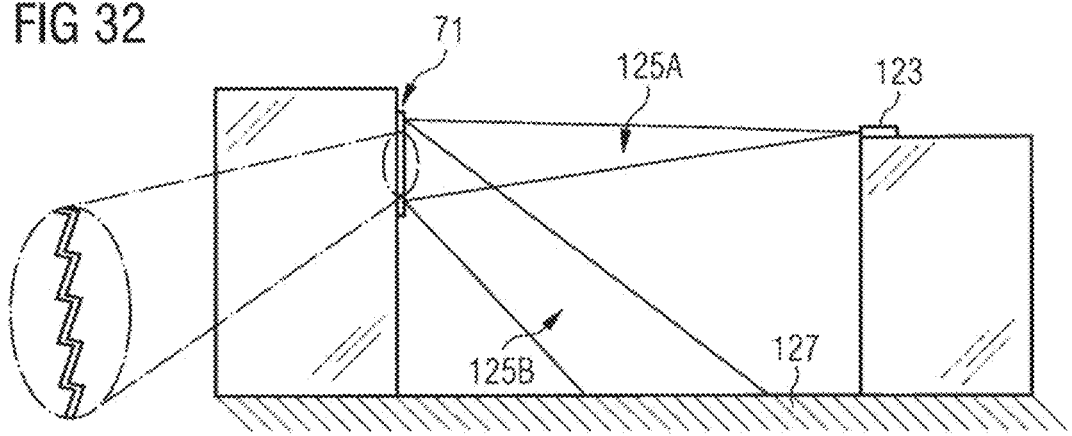
FIG. 32 is a schematic illustration of an illumination concept for outdoor night illumination of a facade element.
Figure 33:
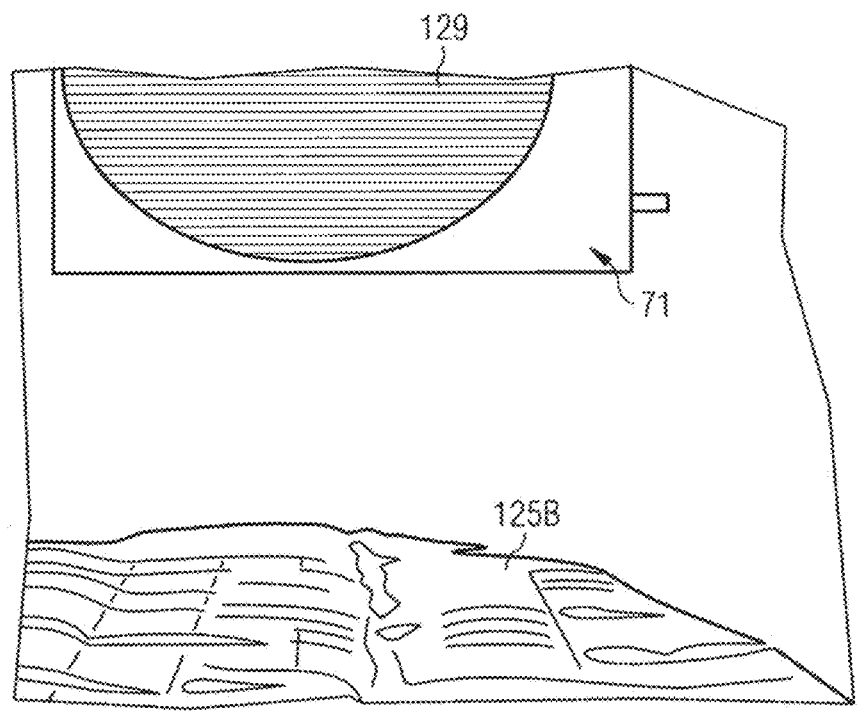
FIG. 33 is an illustration of the appearance of the night illumination of FIG. 32.

Active illumination configurations are described in the following in connection with FIGS. 32 to 34. Specifically, FIGS. 32 and 33 illustrate an outdoor configuration in which structural unit at building 71 (configured as described above in connection with FIGS. 19 to 21 and 24 to 26 and mounted to building 71) is illuminated in particular at night by a projector 123. Projector 123 may be a light source such as disclosed, for example, in the international patent application PCT/EP2014/001293, filed on 13 May 2014 by the same applicants.

As shown in FIG. 32, projector 123 is positioned such that light of a light beam 125A of projector 123 is essentially falling from the side onto structural unit 91 where it is then reflected downwards as a reflected light beam 125B onto ground 127.

FIG. 33 illustrates the appearance of structural unit at building 71 seen from slightly above reflected light beam 125B. Specifically, when looking at structural unit at building 71, one will see the blue diffuse light scattered from within the chromatic diffuse layer. That means a sky-like appearance may be achieved at night.

In addition, reflected light beam 125B will provide for an illumination of ground 127 essentially in the yellow tuned color of the projector.

Figure 34:
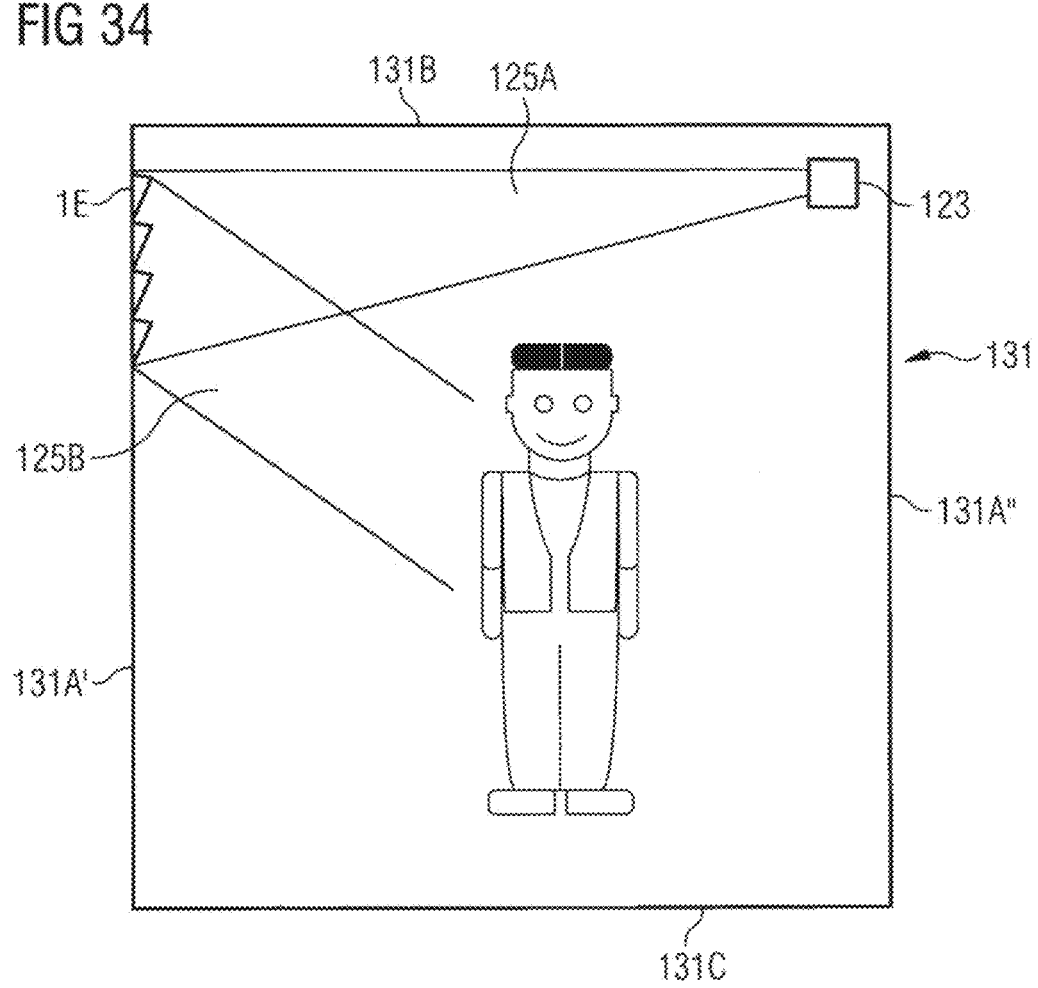
FIG. 34 is a schematic illustration of an indoor illumination concept based on a chromatic reflective unit.

FIG. 34 illustrates an exemplary indoor configuration for an illumination application of the chromatic reflective units described herein. Specifically, in a room or an elevator 131 delimited by walls 131A', 131A", a ceiling 131B, and a floor 131C, a chromatic reflective unit 1E is mounted to wall 131A'. Projector 123 is mounted to ceiling 131B or close to ceiling 131B, for example, at wall 131A" opposing chromatic reflective unit 1E and emits light beam 125A onto chromatic reflective unit 1E. As in FIG. 32, reflected light beam 125B falls onto floor 131C.

A person within room 131, when looking at chromatic reflective unit 1E from the outside of reflected light beam 125B, sees the blueish appearing chromatic reflective unit 1E.

The person, when being within reflected light beam 125B, sees the reflected light.

As described herein, the chromatic diffusing layer can produce a chromatic separation (in terms of correlated color temperature CCT) of the regular (specular) reflected light of reflected light beam 125B from the scattered diffuse light. Specifically, the correlated color temperatures of the diffuse light will be larger than the correlated color temperature of the specular reflected light, for example by a factor 1.2 or 1.1 or the like. Depending on, for example, the color, shape, and homogeneity of the light emitted from projector 123, a sunlight imitating lighting system can be generated as described in the initially introduced applications.

In general, for non-coplanar surface sections, multiple "sun" reflections on chromatic reflective unit 1 may occur that each surrounded by a blue appearance due to diffuse scattered light. They may appear to an observer, for example, as reflections of the sun light on an irregular surface such as reflections of sun light on the waves on a lake.

Figure 35:
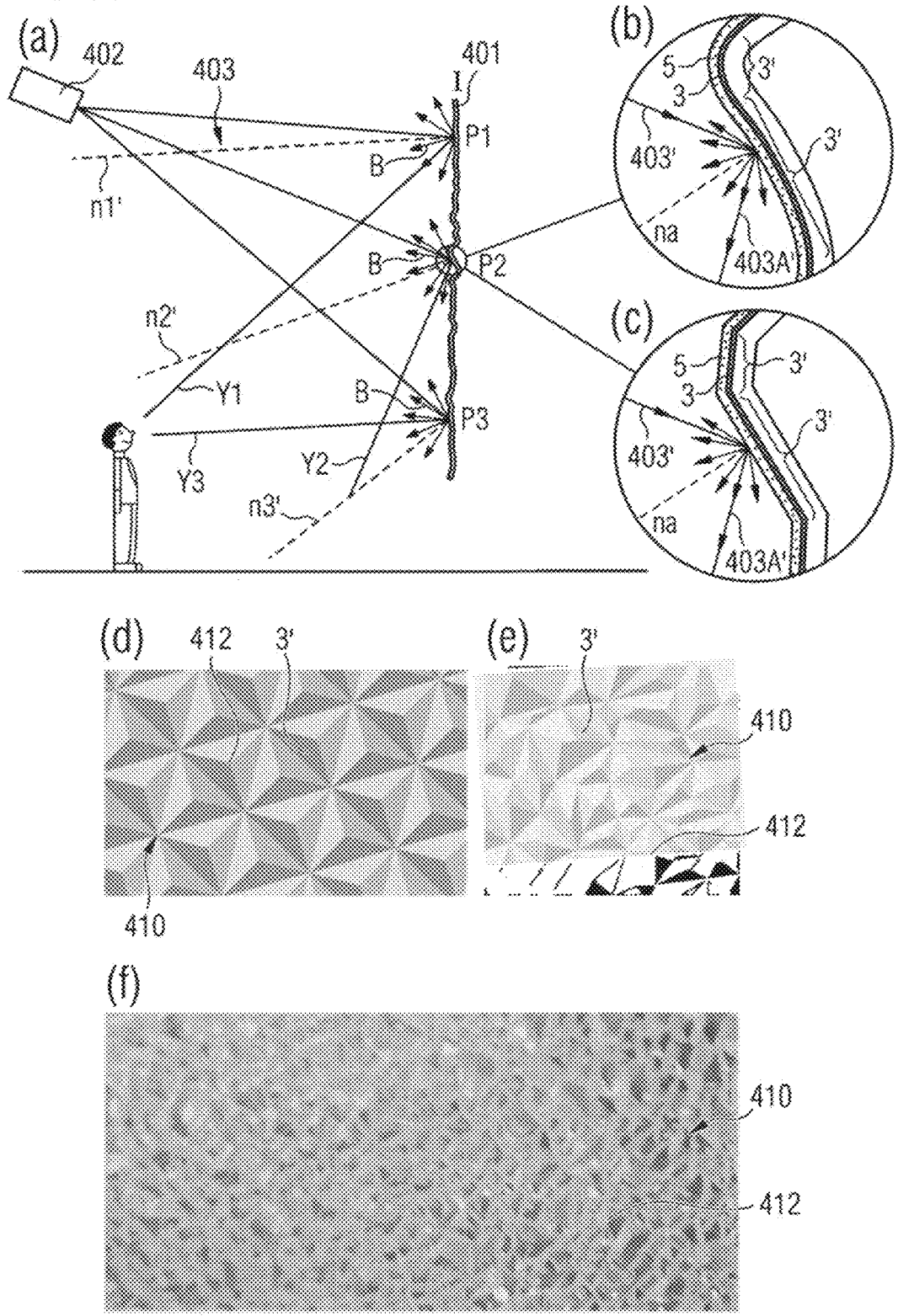
FIG. 35 is an illustration of an illumination system using a chromatic reflective unit having small scale random-like oriented reflective surface sections including exemplary surface structures.

FIG. 35 does exemplarily show embodiments for such a sun-like blinking perception for a chromatic reflective unit having non-coplanar reflective surface sections. In FIG. 35(a), an observer looks at a chromatic reflective unit 401 that is illuminated by a light source 402. Specifically, light source 402 emits a light beam 403 having, for example, an angular divergence in the range up to 80°, such as in a range up to 60°, or a range up to 40° or less.

Chromatic reflective unit 401 may be configured so that the non-coplanar reflective sections 3' are connected and form a continuous coarse grain surface 410. Exemplary cut-views of coarse grain surface 410 are shown in FIGS. 35(b) and 35(c) and exemplary top views are shown in FIGS. 35(d) to 35(f).

As further shown in FIG. 35(a), coarse grain surface 410 is essentially completely illuminated by light beam 403 such that the complete coarse grain surface 410 can be considered a source of Rayleigh-like scattered light B (considered to provide a blue color for a sky-like impression) as indicated for three points P1, P2, and P3 on coarse grain surface 410. Depending on the respective orientation of coarse grain surface 410, the observer may perceive, however, primarily a strong specularly reflected portion Y1, Y3 of light beam 403, e.g. indicated for points P1 and P3. For point P2, the surface is inclined such that the respective portion Y2 of light beam 403 is reflected towards the ground in front of the observer such that the observer only perceives scattered light contributions B from point P2.

The extent of bright light associated with an area on coarse grain surface 410 depends on the extent of the surface that fulfills the specular reflective conditions (in general at least subgroups of non-coplanar surface sections are formed by the coarse grain structure, in particular the mosaic-like surface structures).

Assuming the requirement that the observer can distinguish isolated bright points from the surrounding (the surrounding not contributing to the perceived specular reflection), the required size will be apparent to the skilled person. For example, it depends on the geometry of the illumination system, in particular the distance of the observer to coarse grain surface 410. Depending on the expected distance of the observer to the chromatic reflective unit, surface sections 3' may have the size of several square millimeters or few square centimeters.

For comparison of the reflective feature of coarse grain surface 410 with a planar chromatic reflective surface, for each point P1 to P3, reflected beams n1' to n3' are indicated as dashed lines in FIG. 35(a).

Specifically, the embodiments of FIG. 35 may provide the vision of glittering light peaks (portions Y1, . . . ) based on directed light beam 403, where the glittering light peaks may alternate with sky-like fragments (scattered light B). Chromatic reflective unit 401 may be configured so that non-coplanar reflective surface sections 3' are connected and form a continuous surface.

FIG. 35(b) illustrates as a first exemplary embodiment a smooth surface providing reflective surface sections 3' that essentially fulfill similar specular reflection conditions. Exemplarily, a light beam portion 403' is indicated that is specularly reflected by a reflective surface section to form an illuminating beam portion 403A'. A respective associated normal na is illustrated for that reflective surface section.

FIG. 35(c) illustrates as a second exemplary embodiment in which the smooth surface of FIG. 35(b) is composed of essentially planar facets. The second embodiment again provides a reflective surface sections 3' that provides specular reflection conditions illustrated by an associated normal na, which in this case corresponds to the normal of the planar facet.

In general, coarse grain surface 410, specifically the continuous reflective surface, may be made of a multitude of planar or quasi-planar surface sections of various shapes and extends. The shapes and extends may be configured with higher or lower degree of regularity, order, and/or periodicity such as with a limited number of types of surface sections, shapes, or inclinations.

The continuous reflective surface may be completely (as shown in FIGS. 35(b) and 35(c)) or partially coated with a chromatic diffusing layer 5 to provide (blue) scattering at angles of observation for each single section, i.e. at angles different from the specular reflection direction of light beam 403, which is the main illumination contributions, and thus away from yellow bright luminance in the specular reflection direction. This aspect of—in 2D—mosaic like segmentation of specular reflectivity conditions in combination with the nanoparticle based Rayleigh-like scattering may provide the appearance of many glittering light peaks (beam portions Y)—which will be perceived similar to the case of sun reflected in the water—together with scattered light regions, which may be perceived as sky-like fragments. It is noted that this effect may even be increased when the reflective surface sections are configured in a partly irregular arrangement, with many different shapes, sizes and orientations and with different rays of curvatures, even the limit case of a non-regular and non-periodic sinusoidal (wave-like) profile may provide the desired effect.

FIGS. 35(d) to (f) illustrate exemplary mosaic-like surface structures 412 of continuous coarse grain surfaces 410. The plurality of mosaic-like surface structures 412 are configured to form a faceted surface and provide a plurality of facet-like surface sections for interacting with light beam 403. A correlation area of mosaic-like surface structures 412 is selected to provide for a fragmentation of the vision of the emitting area of light source 402 when seen along an optical path including continuous coarse grain surface 410 from the target illumination/observer area. The plurality of surface sections are configured to redirect incident light beam portions such that the light beam downstream the continuous coarse grain surface 410 is broadened in size—similar to line 407 of constant brightness indicated in FIG. 25. Thereby, the illuminance values on the target illumination/observer area are reduced, while redirected light beam portions exhibit local luminous peaks with a luminance comparable to the luminance of the emitting surface of light source 402.

The correlation area of the mosaic-like surface structures corresponds essentially to the average transversal size of the single mosaic-like surface structure such as one complete surface oscillation (e.g. from a deepest point to a highest point to the next deepest point on the surface). Moreover, the correlation area is essentially comparable in size to the size of the (light interacting) surface section. Accordingly, to be visually resolvable, it is in the range from, for example, about 0.5 mm to 1 m. In principle, the reflective surface section is a fraction of the correlation/transversal size (for example, half in a symmetric geometric shape or even a larger percentage depending on the inclination of the facet structure). As will be understood by the skilled person, "transversal" in this context refers to the surface-type, e.g. a plane parallel to the central plane. Correlation is a defined mathematical term (here the 2D-correlation). It is noted that in case of a non-planar surface, correlation scales larger than the section may appear (e.g. if the unit is curved or itself sinusoidal).

Referring to FIG. 35(d), continuous coarse grain surface 410 comprises several types of pyramids that are arranged to completely cover the surface in a regular arrangement. Thereby, also a set of regularly distributed and identically oriented reflective surface sections are formed.

In contrast, continuous coarse grain surface 410 shown in FIG. 35(e) comprises many more types of different geometrical shapes including inter alia pyramid-like shapes and wedge-like shapes. The geometrical shapes are mosaic-like arranged to completely cover the surface in an irregular arrangement. Thereby, also a set of irregularly distributed and differently oriented reflective surface sections are formed that in addition vary in size.

Similarly to the embodiment shown in FIG. 35(e), continuous coarse grain surface 410 of FIG. 35(f) comprises various types of different shapes that are in general related to geometrical shapes but may—for example due to the processing procedure—to some extend rounded. As can be seen, the faceted structure is made of curved facets that are located either directly next to each other or are separated by some planar transition surface section. The structures have, for example, again pyramid-like shapes and wedge-like shapes. In addition, the height of the mosaic-like structure may vary more than in FIG. 35(e). Thereby, again a set of irregularly distributed and differently oriented and differently sized reflective surface sections are formed.

As a general indication, the x (or y) size of the sections, the x (or y) average size of the patches, the x (or y) local periodicity of the oscillating surface or, in general the x (or y) support structure size to support on average a single oscillation of the reflective surface (one local maxima and one local minima of the distance to a reference plane) may be configured so that, for an observer standing in the installation ambient, the individual surface sections are optically resolvable by eye in order to appreciate color and brightness variations. For indoor applications reflective sections may extend about or larger than 1 mm, such as few centimeters or even larger than 0.2 m. For outdoor applications, the surface sections may be larger than 5 mm, such as 0.3 m, or even larger than 0.5 m.

When interposed between a light source (this can be a specific light projector or also Sun or a distribution of luminance with some peaks etc.) and the observer, the chromatic reflective units based on mosaic-like surface structures provide in appearance a fragmentation (such as a partition-chopping-splitting) of the source in many smaller perceived sources with comparable (in general not significantly reduced) luminance but with significant smaller size (angular size, for a fixed observer distance from the source).

Those smaller luminance peaks are obviously distributed over a large angular range with respect to the original source angular shape.

This produces in terms of visual appearance the same perception of brightness produced by the original source (local peaks preserve the brightness level of the source) provided that the optical structures can be resolved by the observer's eye (e.g. light peaks essentially do not mix up), thereby providing, for example, of the sun being reflected in the water—together with scattered light regions, which may be perceived as sky-like fragments.

This appearance is specific and stands in contrast with a fine-structured diffuser (that would be perceived when the optical structures are not resolvable) as in that case the luminance is averaged and the high-level peaks are smoothed and significantly reduced as a result.

Referring again to FIG. 35(a), in projection the illustrated illumination system produces a broadening and a smoothing of the projected light spot obtainable from the light source without the coarse-grain frost. In other words, the in connection with FIG. 35 disclosed embodiment introduce a type of a non-absorbing Rayleigh-like scattering coarse-frost unit based on non-coplanar surface sections.

The configuration combines the chopping of luminance into small regions with diffusing the blue component as a Rayleigh diffuser.

This allows to obtain a smearing and a broadening of the direct light spot by a fragmentation of the emitting area of the source, yet each being perceived as the "sun" in terms of color and luminance though chopped in smaller sources, while the sky color may be preserved.

In some embodiments, continuous coarse grain surface 410 may be coated with a chromatic diffusing layer as disclosed herein.

Although exemplary embodiments of this invention have been described herein, embodiments may be combined, e.g. in a façade element or in one illumination system such as combining on a chromatic reflective unit random and plan-parallel reflective surface sections.

Although the preferred embodiments of this invention have been described herein, improvements and modifications may be incorporated without departing from the scope of the following claims.

The invention claimed is:

1. A chromatic reflective unit comprising:
a support structure comprising a plurality of non-coplanar surface sections,
a reflective layer formed on the plurality of non-coplanar surface sections, thereby forming a plurality of non-coplanar reflective surface sections, respectively associated with one of the plurality of non-coplanar surface sections, and
a chromatic diffusing layer having a back side provided at the reflective surface sections and a front side configured to be illuminated by incident light, wherein the chromatic diffusing layer comprises a plurality of nano-particles embedded in a matrix, and wherein the reflective layer and the chromatic diffusing layer are configured to provide for a specular reflectance that is larger in the red than in the blue and for a diffuse reflectance that is larger in the blue than in the red.

2. The chromatic reflective unit of claim 1, wherein the reflective layer continuously extends on the non-coplanar surface sections of the substrate structure, and is in particular directly applied on and structurally directly connected to the non-coplanar surface sections.

3. The chromatic reflective unit of claim 1, wherein the reflective surface sections of at least a subgroup of the plurality of non-coplanar reflective surface sections form a sequence of reflective surface sections having essentially an identical orientation in space and/or an identical shape.

4. The chromatic reflective unit of claim 1, wherein the reflective surface sections of at least a subgroup of the plurality of reflective surface sections are characterized by a reflective surface section normal, and the reflective surface section normal is inclined with respect to a local unit normal that is associated with a respective portion of a surface-type of the chromatic reflective unit, and
wherein the reflective surface section normal is inclined with respect to the local unit normal by an angle in the range from about 2° to about 88°.

5. The chromatic reflective unit of claim 1,
wherein the chromatic reflective unit comprises a planar panel shape and planar non-coplanar surface sections, and the non-coplanar surface sections are non-parallel with respect to the planar panel shape.

6. The chromatic reflective unit of claim 1, wherein the chromatic reflective unit comprises a planar surface-type with a planar viewable face and the reflective surface sections of the plurality of reflective surface sections have a rectangular shape with a width in a width direction (w) that extends along the viewable face and a height extending in a height direction (h) under an inclination angle with respect to the viewable face.

7. The chromatic reflective unit of claim 1, wherein the reflective surface sections of the plurality of reflective surface sections are oriented with respect to each other to form a step arrangement of reflective surface sections.

8. The chromatic reflective unit of claim 1, wherein the reflective surface sections of at least a subgroup of the plurality of non-coplanar reflective surface sections form a sequence of reflective surface sections being random in their orientation in space.

9. The chromatic reflective unit of claim 1, wherein a shape associated with the plurality of non-coplanar reflective surface sections is characterized by a variation in a distance (d) to a reference plane that is measured along a straight measurement line (y) extending along the reference plane, wherein the reference plane is coplanar with respect to a central plane of the plurality of non-coplanar reflective surface sections, the central plane has a diffusing layer side and a reflector side, the reference plane is displaced from the central plane at the diffusing layer side beyond any one of the plurality of non-coplanar reflective surface sections, and the variation in the distance (d) comprises at least three local extrema, and in particular the distance (d) increases and decreases at least twice along the measurement line (y).

10. The chromatic reflective unit of claim 1, wherein the chromatic reflective unit is configured as a sandwich structure that comprise a sequence of sections providing the reflective surface sections.

11. The chromatic reflective unit of claim 1, wherein the support structure comprises a sequence of mirror units, each mirror unit forming a reflective surface section of the plurality of non-coplanar reflective surface sections, and each mirror unit comprising a chromatic diffusing layer section of the chromatic diffusing layer, and
the support structure further comprises a mounting structure for mounting the mirror units in an orientation providing the non-coplanarity of the reflective surface section.

12. The chromatic reflective unit of claim 11, wherein the mirror units of the sequence of mirror units comprise
a supporting structure made of glass, PMMA, or a metal having applied thereon and/or integrated therein the reflective layer or the chromatic diffusing layer.

13. The chromatic reflective unit of claim 11, wherein:
the mirror units of the sequence of mirror units comprise a sandwich structure;
the sandwich structure is an aluminum or steel composite panel having a mount-sided stabilizing layer, an illumination-sided stabilizing layer, and a core layer therebetween, and
the reflective layer section is provided on or integrated into the illumination-sided stabilizing layer and the chromatic diffusing layer section is applied onto the reflective layer section or onto the illumination-sided stabilizing layer.

14. The chromatic reflective unit of claim 1, wherein the chromatic diffusing layer is in contact with the reflective layer sections.

15. The chromatic reflective unit of claim 1, wherein a difference in the refractive index of the nanoparticles with respect to the refractive index of the matrix, a size distribution of the nanoparticles, and a number of nanoparticles per unit surface area are selected to provide for the specular reflectance that is larger in the red than in the blue and for the diffuse reflectance that is larger in the blue than in the red, and
wherein in particular the differences in the specular reflectance and the diffuse reflectance are given as average values with respect to a blue portion in the spectral range from 450 nm to 500 nm and a red portion in the spectral range from 620 nm to 670 nm.

16. The chromatic reflective unit of claim 1, wherein the nanoparticles contributing to the differences in the specular reflectance and the diffuse reflectance and the matrix are essentially non-absorbing.

17. The chromatic reflective unit of claim 1, wherein the relative refraction index $$m \equiv \frac{n_p}{n_h},$$

where $n_p$ is the refractive index of the nanoparticles and $n_h$ is the refractive index of the matrix, is in the range $0.5 \leq m \leq 2.7$, and
for m being in particular in the range $0.7 \leq m \leq 2.1$, an effective particle diameter, $D = dn_h$, fulfills
D [nm] $\leq$ 132m+115 if $0.7 \leq m < 1$;
D [nm] $\leq$ 240 if $1 < m < 1.35$; and
D [nm] $\leq$ -135m+507 if $1.35 \leq m \leq 2.1$.

18. The chromatic reflective unit of claim 1, wherein along a thickness propagation direction through the chromatic diffusing layer, the number of nanoparticles per unit area is $$N \leq N_{max} = \frac{3.7 \times 10^{-28}}{D^6} \left| \frac{m^2 + 2}{m^2 - 1} \right|^2 \text{ [meters}^{-2}\text{]},$$

D being given in meters, and/or
the maximum filling fraction is $f \leq 0.4$.

19. The chromatic reflective unit of claim 1, wherein the chromatic diffusing layer further comprises
particles contributing to absorption of a limited spectral range for superimposing a coloring to the appearance of the chromatic reflective unit; and/or
particles having a size larger than the nanoparticles contributing to the differences in the specular reflectance and the diffuse reflectance, wherein the particles that contribute to an increase forward scattering, thereby decreasing the specular reflectance, and wherein the specular reflectance is decreased in particular essentially independent of the color.

20. The chromatic reflective unit of claim 1, wherein the reflective layer is a continuous metal layer on the non-coplanar surface sections.

21. The chromatic reflective unit of claim 1, wherein the reflective layer is formed by a surface portion of the support structure.

22. The chromatic reflective unit of claim 1, wherein the reflective surface sections of at least a subgroup of the plurality of non-coplanar reflective surface sections are distributed uniformly with respect to each other.

23. The chromatic reflective unit of claim 1, wherein the plurality of non-coplanar surface actions is imprinted onto the support structure.

24. The chromatic reflective unit of claim 1, wherein the support structure comprises an illumination-sided stabilizing layer with a 3D-surface structure or an imprinted shape that provides the basis of the form and orientation of the non-coplanar surface sections, and thus the reflective surface sections.

25. A chromatic reflective unit comprising:
a support structure configured as a chromatic diffusing layer having a back side comprising a plurality of non-coplanar surface sections and a front side configured to be illuminated by incident light, wherein the chromatic diffusing layer comprises a plurality of nanoparticles embedded in a matrix; and a reflective layer formed on the plurality of non-coplanar surface sections of the back side, thereby forming a plurality of non-coplanar reflective surface sections, respectively associated with one of the plurality of non-coplanar surface sections;

wherein the reflective layer and the chromatic diffusing layer are configured to provide a specular reflectance that is larger for wavelengths in the red than for wavelengths in the blue and a diffuse reflectance that is larger for wavelengths in the blue than for wavelengths in the red.

26. A chromatic reflective unit comprising:

a support structure comprising a continuous coarse grain surface comprising a plurality of mosaic surface structures providing a plurality of surface sections, a reflective layer formed on the continuous coarse grain surface thereby forming a plurality of non-coplanar reflective surface sections, and a chromatic diffusing layer having a back side provided at the reflective surface sections and a front side for being illuminated by incident light, wherein the chromatic diffusing layer comprises a plurality of nanoparticles embedded in a matrix, and wherein the reflective layer and the chromatic diffusing layer are configured to provide a specular reflectance that is larger for wavelengths in the red than for wavelengths in the blue and a diffuse reflectance that is larger for wavelengths in the blue than for wavelengths in the red.

27. The chromatic reflective unit of claim 26, wherein the plurality of surface sections are configured to redirect incident light beam portions such that a light beam after reflection at reflective layer on the continuous coarse grain surface is broadened in size, the illuminance values on the target illumination/observer area are reduced, redirected light beam portions exhibit local luminous peaks with a luminance comparable to the luminance of the emitting surface, and scattered light is perceived around redirected light beam portions.

28. The chromatic reflective unit of claim 26, wherein a correlation area of the mosaic surface structures is selected to provide a fragmentation of the vision of the light source emitting area when seen along an optical path including the continuous coarse grain surface from a target illumination/observer area.

29. The chromatic reflective unit of claim 28, wherein the depth of the mosaic surface structures is comparable to the correlation area.

30. The chromatic reflective unit of claim 26, wherein each surface section is geometrically configured in shape, size, and inclination to optically redirect the light beam portion impinging on it to an average output direction that at least differs and/or is completely independent on the average direction of redirection of at least one adjacent surface section.

31. The chromatic reflective unit of claim 26, wherein:

the correlation area of the mosaic surface structures corresponds to the average transversal size of the single mosaic surface structure, is essentially comparable in size to the size of the surface section, and is defined by one complete surface oscillation, and the correlation area is in the range from about 0.5 mm to 1 m.

32. The chromatic reflective unit of claim 26, wherein the mosaic surface structures comprise faceted structures based on geometric shapes selected from polyhedron shapes, prism shapes, pyramid shapes, wedge shapes, and cube shapes, wherein the faceted structures extend from or reach into the continuous coarse grain surface.

33. The chromatic reflective unit of claim 32, wherein the faceted structures comprise rounded transitions of adjacent facets and/or curved facet surfaces.

34. A chromatic reflective unit comprising:

a support structure configured as a chromatic diffusing layer having a back side comprising a continuous coarse grain surface comprising a plurality of mosaic-like surface structures providing a plurality of surface sections and a front side for being illuminated by incident light, wherein the chromatic diffusing layer comprises a plurality of nanoparticles embedded in a matrix; and a reflective layer formed on the a continuous coarse grain surface thereby forming a plurality of non-coplanar reflective surface sections;

wherein the reflective layer and the chromatic diffusing layer are configured to provide a specular reflectance that is larger for wavelengths in the red than for wavelengths in the blue and a diffuse reflectance that is larger for wavelengths in the blue than for wavelengths in the red.

* * * * *